US006205728B1

(12) United States Patent
Sutelan

(10) Patent No.: US 6,205,728 B1
(45) Date of Patent: Mar. 27, 2001

(54) LAMINATED COMPOSITE BUILDING COMPONENT

(76) Inventor: Frank Sutelan, 114A Fifty Third St., Virginia Beach, VA (US) 23451-2310

( * ) Notice: Subject to any disclaimer, the term of this patent is extended or adjusted under 35 U.S.C. 154(b) by 0 days.

(21) Appl. No.: 08/841,356

(22) Filed: Apr. 30, 1997

(51) Int. Cl.⁷ ................................ E04C 2/24; B32B 3/28
(52) U.S. Cl. .................. 52/309.7; 52/588.1; 52/783.17; 52/798.1; 52/309.5; 428/71; 428/182; 428/309.9
(58) Field of Search .............................. 52/309.1, 309.4, 52/309.5, 309.7, 588.1, 630, 783.11, 783.17, 783.19, 793.1, 745.05, 798.1; 428/116, 117, 309.9, 313.9, 68, 71, 355 R, 182, 184, 317.1

(56) References Cited

U.S. PATENT DOCUMENTS

| | | | |
|---|---|---|---|
| 1,659,539 | * 2/1928 | Judson | 52/783.19 X |
| 3,583,123 | 6/1971 | Holmgren et al. | 52/584 |
| 3,900,625 | * 8/1975 | Chen | 428/110 |
| 3,960,999 | * 6/1976 | Massie | 428/256 X |
| 4,070,839 | 1/1978 | Chem | 52/783.17 X |
| 4,139,670 | * 2/1979 | Fehlmann | 52/630 X |
| 4,159,681 | 7/1979 | Vandament | 108/51.1 |
| 4,241,555 | 12/1980 | Dickens et al. | 52/454 |
| 4,351,870 | 9/1982 | English, Jr. | 428/174 |
| 4,558,550 | 12/1985 | Marchais et al. | 52/309.7 |
| 4,611,450 | 9/1986 | Chen | 52/309.4 |
| 4,743,625 | * 5/1988 | Vajs et al. | 428/305.5 X |
| 4,767,656 | * 8/1988 | Chee et al. | 428/116 |
| 4,774,794 | 10/1988 | Grieb | 52/309.7 |
| 4,861,642 | * 8/1989 | Stagg et al. | 428/139 |
| 4,903,446 | 2/1990 | Richards et al. | 52/223 R |
| 5,638,651 | 6/1997 | Ford | 52/309.7 |
| 5,664,382 | 9/1997 | Melnick et al. | 52/425 |
| 5,738,924 | * 4/1998 | Sing | 428/116 X |
| 5,792,552 | * 8/1998 | Langkamp et al. | 428/309.9 |

* cited by examiner

*Primary Examiner*—Carl D. Friedman
*Assistant Examiner*—Winnie S. Yip

(57) ABSTRACT

A laminated composite building component, capable of sustained axial stress as a primary support structure and enclosure of a building structure, comprising a lamination of rigid and resilient material, said rigid material formed of sheets with continuous corrugations parallel to the supporting axis and which have opposite faces being bonded to and encapsulated by said resilient material, said resilient material being a cellular foam matrix, an adhesive or fusion that bonds the rigid and resilient material together in either a static or continuous laminating process, said resilient material forming two outer surfaces spaced from the rigid material, said rigid material having opposite lateral edges being exposed from said resilient material, said lateral edges of the rigid material having return flanges for interlocking said laminated composite building component with adjacent building component, and said building components capable of being supplied and distributed in generic lengths and custom field-cut like lumber.

39 Claims, 27 Drawing Sheets

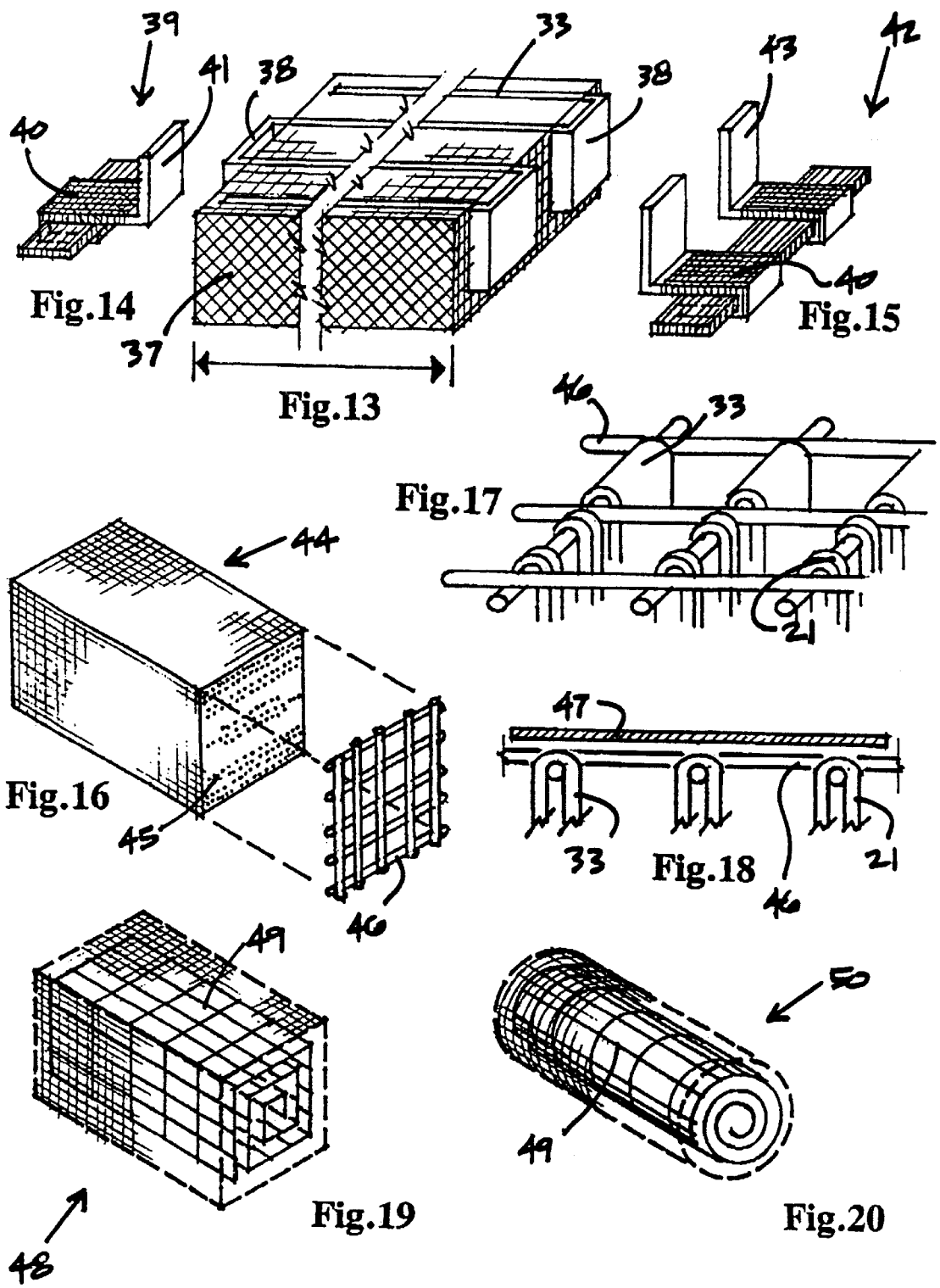

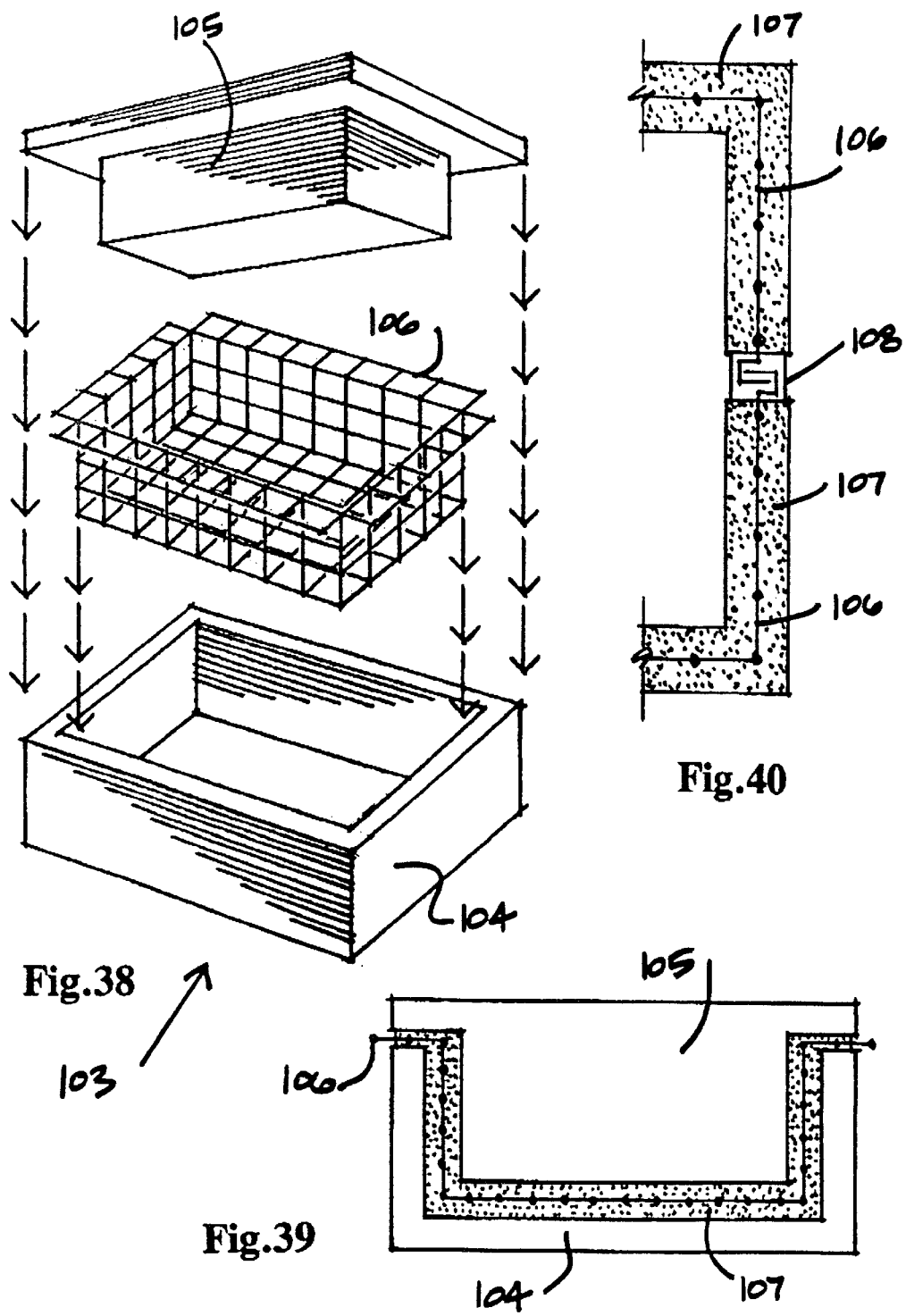

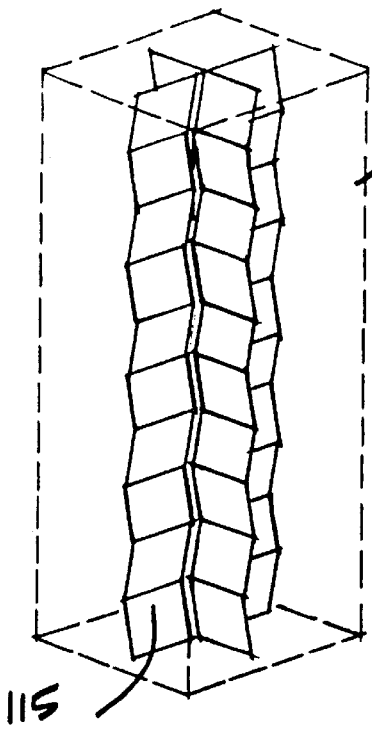
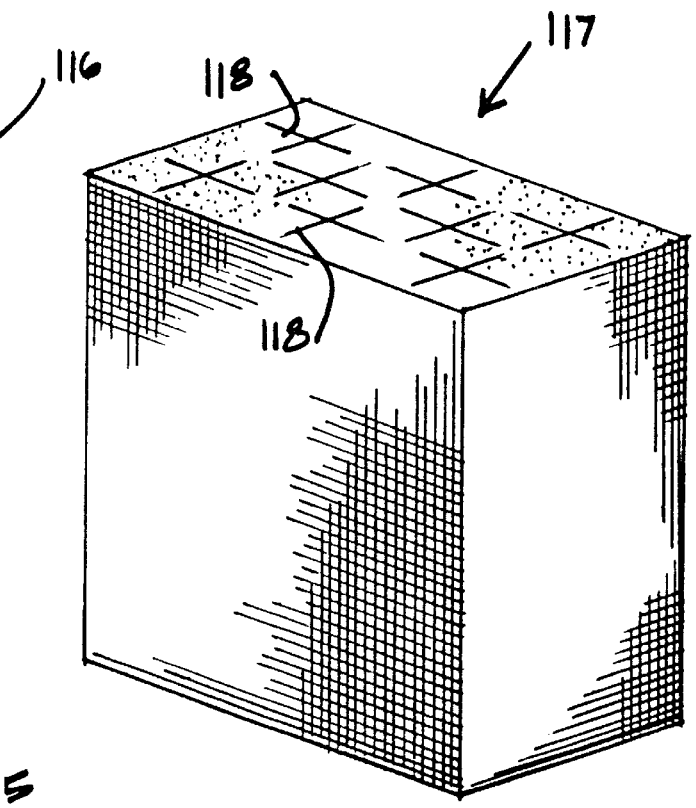
Fig.48
Fig.49
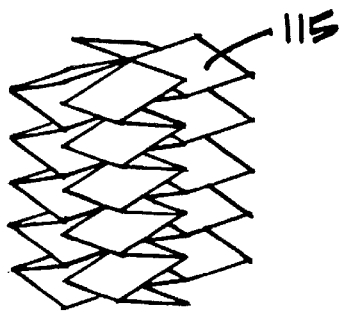
Fig.47
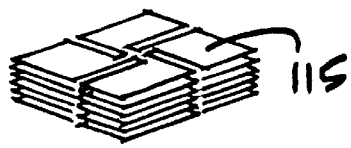
Fig.46
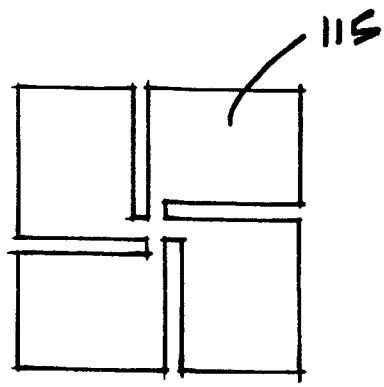
Fig.45

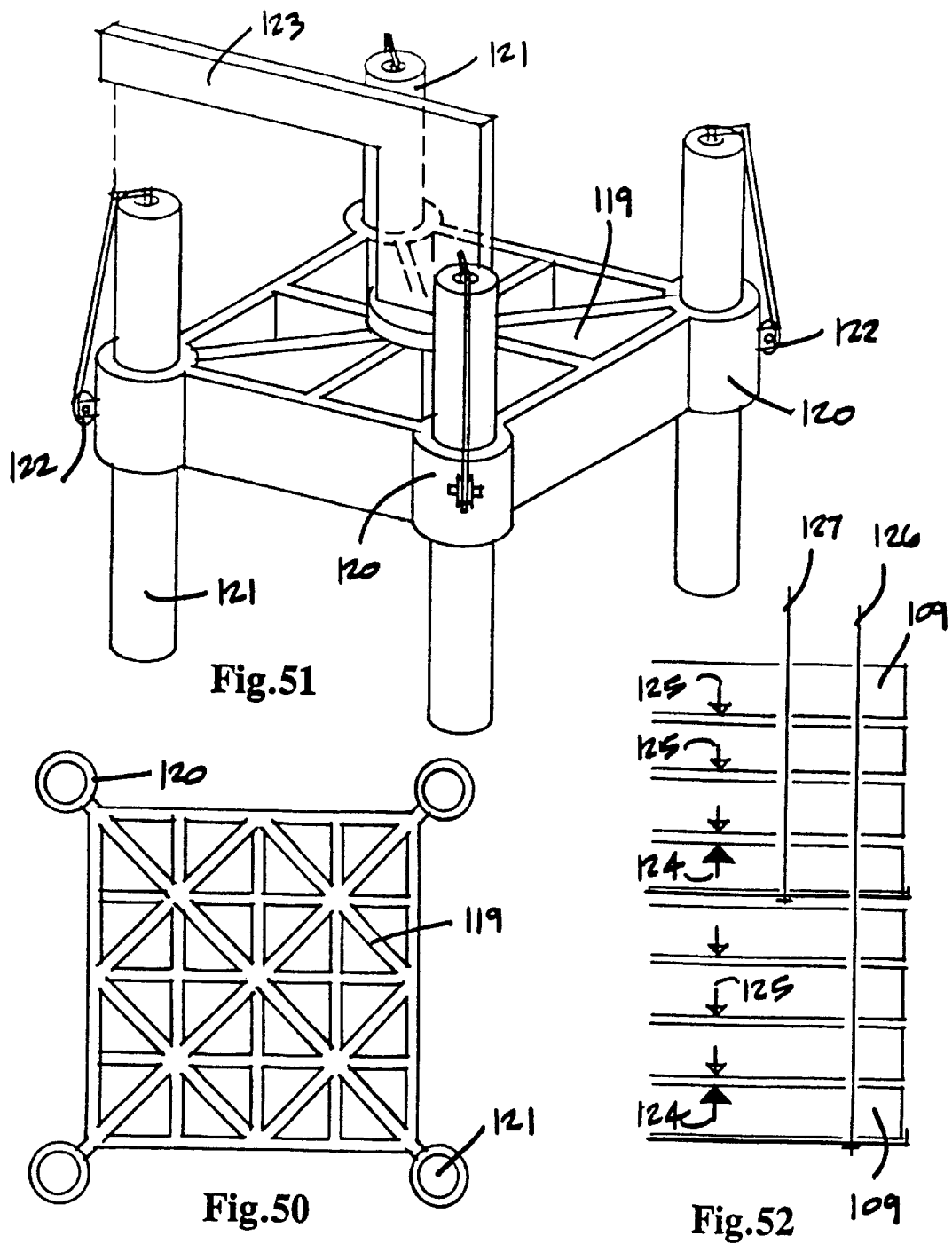

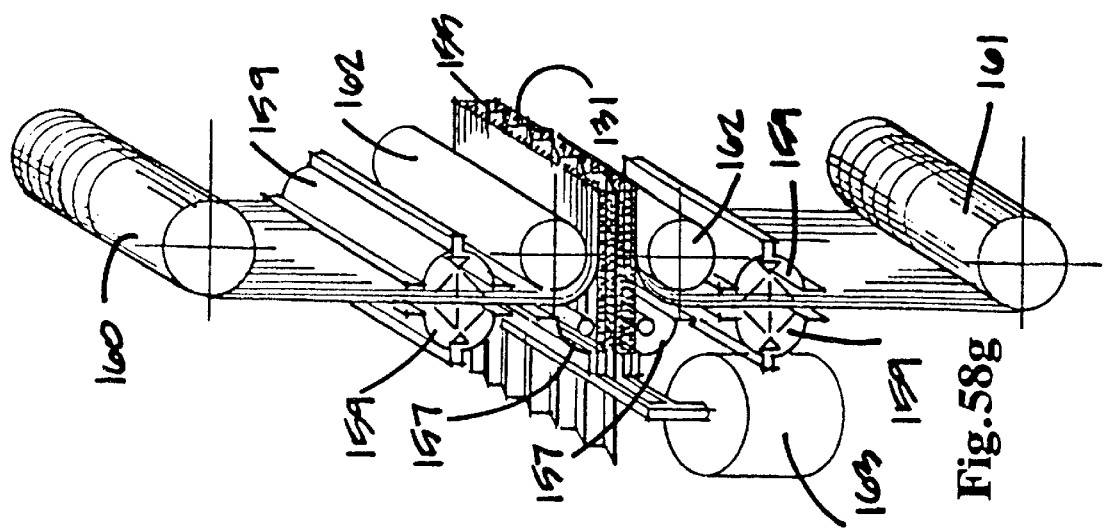
Fig.58g
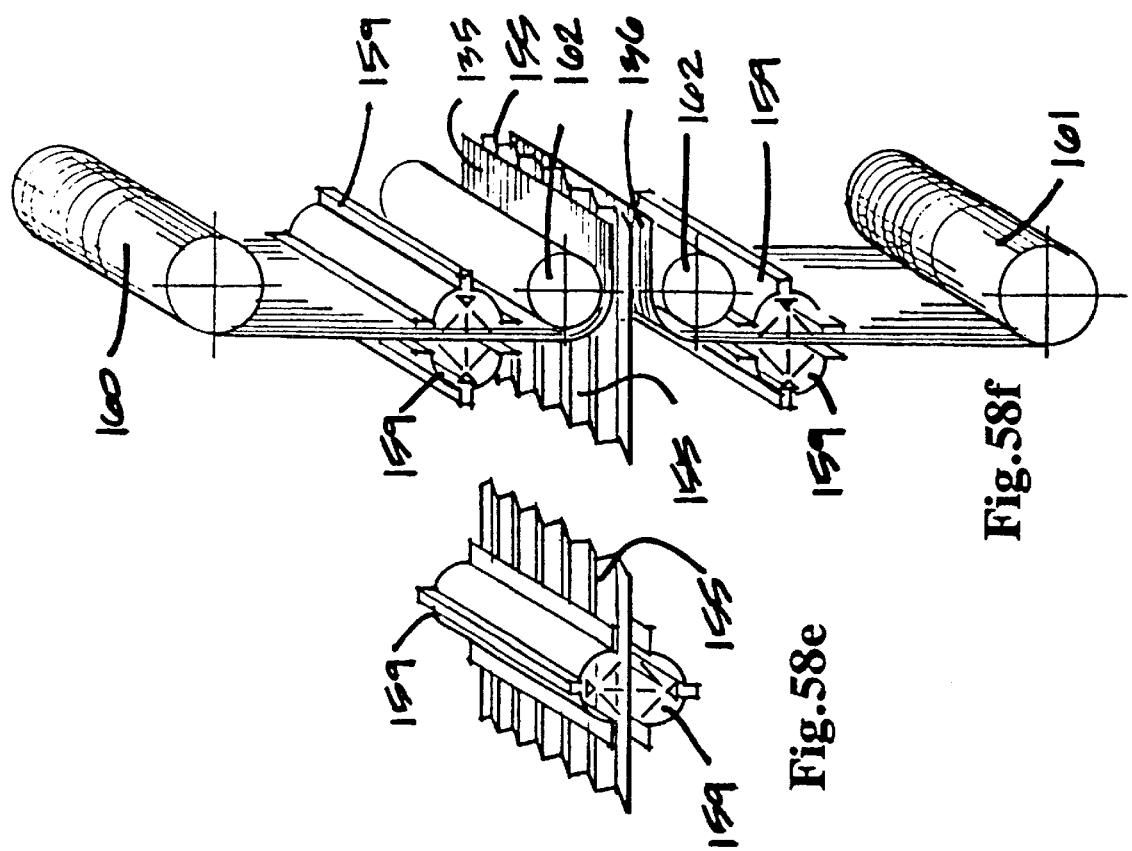
Fig.58f
Fig.58e

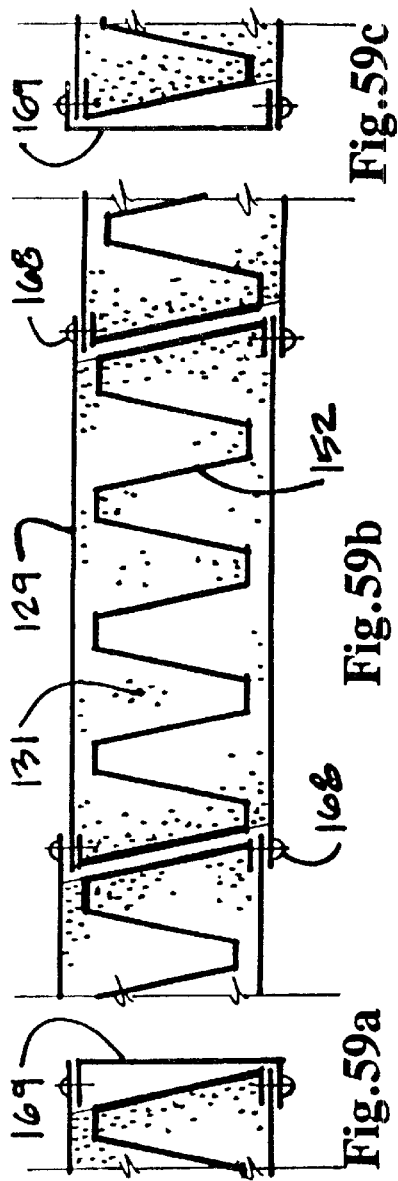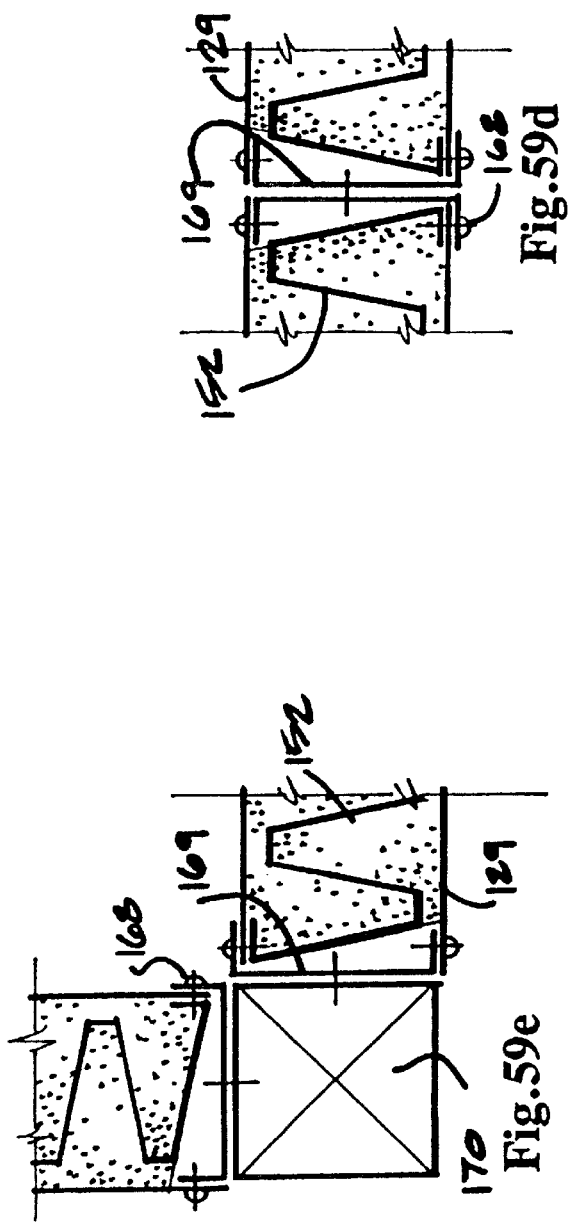

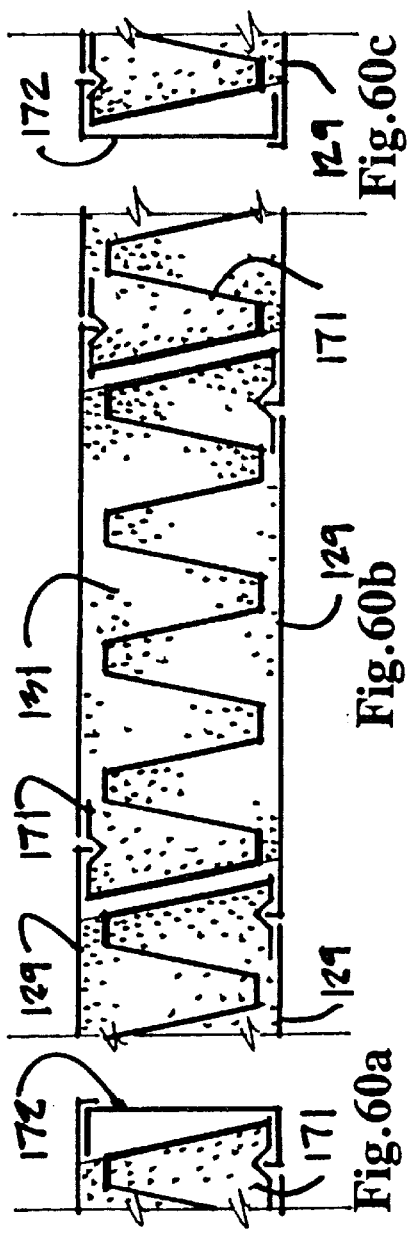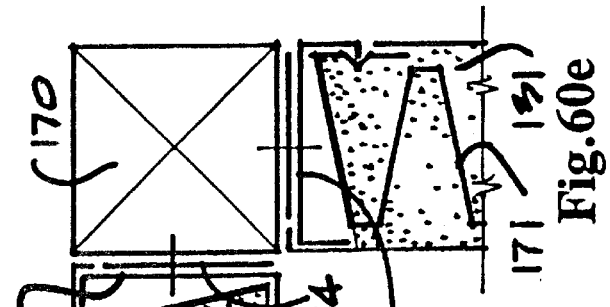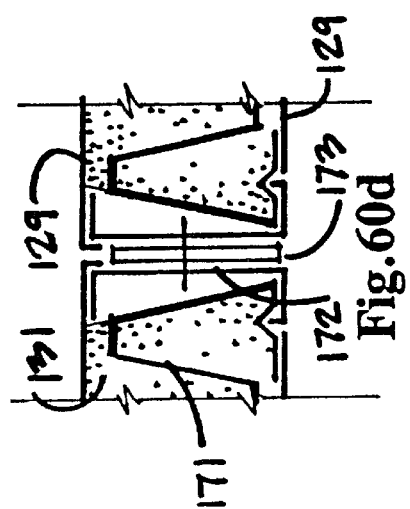
Fig.60a  Fig.60b  Fig.60c  Fig.60d  Fig.60e

LAMINATED COMPOSITE BUILDING COMPONENT

FIELD OF THE INVENTION

A laminated composite building component, capable of sustained axial stress as a primary support and enclosure of a building, wherein corrugated sheets with lateral edges configured to interlock with adjacent components are encapsulated and stiffened by a foam matrix.

BACKGROUND OF THE INVENTION

Historically, the effective strength of a column never approaches the ultimate strength of the material it's made of, because failure always precedes it due to inherent weaknesses in its shape. A column is a structural unit carrying loads which act parallel to the longitudinal axis of the member. If the applied load is eccentric to the axis, there is a lateral deflection and a resultant bending stress which combine with the direct compression and ultimately lead to failure of the member due to buckling. If the load could be applied exactly coincident with the longitudinal axis . . . if the member were perfectly straight . . . and if the material were homogeneous . . . then the column would be stressed in pure compression.

Heretofore, it's been impossible to produce this ideal member, and columnar design has had to factor in an equivalent eccentricity of load by using the empirically formulated Slenderness Ratio L/D . . . which is the laterally unsupported column length L divided by the minimum cross-section width, or diameter D. The tendency of the column to deflect laterally and develop bending stresses increases with L and decreases with D, so the taller the column . . . the weaker the section, and the shorter . . . the stronger. Hence, in the prior art the ultimate strength of a column has been governed more by its geometry . . . than what it's made of.

The present invention maximizes the strength of a pure column by negating its inherent weakness, the elongation, by reducing the laterally unsupported length and thus the Slenderness Ratio . . . to zero, by total encapsulation in and adhesion to plastic foam. This allows it as a homogeneous material to perform at ultimate strength, maximizing efficiency while minimizing material need. Here, although it carries no direct axial load, the plastic foam neutralizes the equivalent eccentricity of load, facilitates the pure compression of an ideal member, supercharges column ability, generates synergy . . . and supersedes history.

The intention here is to conquer the essence of this synergy . . . and domesticate it. With elongate structure adhered to and encapsulated by a core of plastic foam, the resultant composite is not only strong, resilient and moisture resistant but also ideal for building construction with a strength to weight ratio up to a thousand to one. With endless possibilities for longer spans, greater cantilevers, three-dimensional module building, and ultra-lite assembly systems, it's so novel that it puts a whole new dimension on architectural concepts and, with a myriad of applications, facilitates a new technology.

However, in building construction plastic foam has vices as well as virtues. As a foam structure it's hard to analyze and as a material it's chemically volatile. Thus it's totally dependent on and limited by empirical testing for every structural application, which is expensive and time-consuming, and drywall or its equivalent for every habitable use, items which are usually heavy, brittle and the antithesis of the foam's intrinsic nature.

The obvious technological potential here is prefabrication. But since the beginning of the industrial revolution, people have been trying unsuccessfully to minimize on-site labor costs with prefabricated panels. Over the years only two panels have proved viable and enduring, drywall and plywood, and neither of these are load-bearing . . . just facings. Other than that, today's house is still being built stick by stick just as it was long ago. The dilemma with structural panels is access and finish in that, after installation, internal access is ordinarily required for the placement of utility lines and overly finished panels tend to be inaccessible. If the pipes and wires are pre-installed per panel, splices between panels reduce line efficiency, increase labor, and defeat the purpose of prefabrication. Also, finished panels have abutting edges which are impossible to hide or relate to adjacent spaces. Hence, the ideal building panel would be a semi-finished load-bearing structure, with constant and convenient internal access, of an approved heat and fire resistant material, with cost-savings both in expedient manufacture and systematic on-site assembly.

SUMMARY OF INVENTION

Therefore, it is the principal object of the present invention to create a homogeneous heat and fire resistant laminated polymeric foam material that generates the characteristics of an ideal structural material in the facilitation of arbitrary shapes with identical physical behavior at all points. The rigid material, as the primary high performance structure capable of sustained stress, is either laminated to the surface of the composite as a stressed-skin membrane, or encapsulated within the body of the core as a corrugated sheet or skeleton structure that is bonded to and laterally braced by the resilient material. As a surface laminate, the membrane may also be fire resistant. As a corrugated sheet, it may also be thermoformed and integrated into the body of the composite in a continuous manufacturing process. And, as a skeleton, its structure may be a plurality of high strength elongate members arranged in parallel according to anticipated axial stresses. The resilient material may be an expanded polymeric foam, and the rigid material may be anything ordinarily associated with the high tensile and compressive properties of structural components in building construction. Rigid members may also be placed along the outer edges of the molded formations in order to maintain dimensional stability after cooling.

In the present invention with the exception of the stressed-skin sheets, the primary supporting structure is inside the body of the core with the laminate contact area maximized by total encapsulation. In known materials, the beneficial laminate effect of plastic foam on a relatively flimsy planar structure has demonstrated a great strength which the present invention intends to amplify. After encapsulation, the next priority is a versatile geometry that lends itself to both universal distribution and continuous spool feed into the cavity of the mold. Pursuant to this method, elongated circular and flat shapes such as wire and ribbon are favored, wire more versatile but ribbon stronger in one direction. As a structural prototype, consider a Styrofoam™ cylinder about the size of a wooden spool of thread. Next, push straight pins into the end of the cylinder. Depending upon the ultimate composite strength desired, one could put any number from one to one-hundred pins into the shape and, depending on the quantity selected, obtain a scientifically and mathematically predictable change in the structural performance of the Styrofoam™ cylinder. Finally, primecoat the pins with an adhesive which bonds them to the cellular structure of the Styrofoam™ for additional composite strength.

The delicate design theory here involves a most sophisticated balance between the structural steel shape, the molecular behavior of the particular polystyrene selected, and the structural characteristics of the heat activated adhesive. As a specific structural shape, the pin is circular, not unlike a wire, which automatically lends itself to the aspect of tension which is strictly lineal. Complete structural integrity, however, is also based on compression, hence, individual wires acting as independent columns. In columnar design, unsupported length leading to buckling of the member is the most critical tendency to failure, and it is based on the unsupported length of the column between lateral braces-which is usually floor slabs or structures. Hence, the shorter the column, the stronger its capability. Here, the capability of the pin as an elongated form will be significantly enhanced by the strength and performance of the plastic foam laterally bracing the wires. In effect, the shear strength of the bond and the pressure of the encapsulation tend to stiffen the elongate members and significantly increase their resistance to buckling. This greatly enhances their compressive performance as columns despite substantially slender profiles.

But just how slender is "substantial"? To put this in perspective, a relative measure of column instability called the "slenderness ratio" divides the effective unbraced length of a column by about one-third its effective structural diameter. The acceptable range for steel is between 120 and 200. Below is overdesign, and above is unacceptable, but conducive to homogeneity. The composite of the present invention is more like a reinforced column, which should never exceed 60. For an eight foot height, the slenderness ratio of an unassisted 6" pipe is 50, a 1" rod is 300, and a single 24 gage wire is 12,500. But, if this wire is continuously braced laterally and there are many of them encapsulated in the foam, there is an accumulative performance of strength. Heretofore, it should be obvious that wires were never used as columns, but now as a composite that perspective changes, and can take on a different meaning. In essence, the laminate effect of skeleton and core tends to reduce the effective unbraced member length to zero, thus lowering the "slenderness ratio" also to almost nothing, thereby resulting in a tremendous resistance to lateral force and, ultimately, to failure.

But controlling the structural mechanics of the composite is only part of the solution, because the foam core itself cannot be used in any building without appropriate fire control. Conventionally, this means an inevitable dependence on drywall. The core material is polystyrene foam, which can be hazardous. Although its flame spread and smoke development ratings are initially low, it is contribution to an on-going fire can be significant. The point of ignition is twice as high as wood, but so is its heat. Hence, the building codes severely restrict its use as follows:

"All foam plastic needs to be separated from the interior of a building by an approved thermal barrier of ½" gypsum wallboard or equivalent thermal barrier which will limit the average temperature rise of the unexposed surface to not more than 250° F. after 15 minutes of fire exposure, complying with the standard time-temperature curve of ASTM E119. The thermal barrier shall be installed such that said thermal barrier will stay in place for a minimum of 15 minutes under the same test conditions".

The U.S. Pat. No. 4,241,555 to Dickens discloses one particular structural insulated panel that is both strong, lightweight and resilient. However, this panel must be placed behind the protective shield of drywall for its very existence inside any building. When drywall becomes the solution, weight control becomes an issue, and in conventional construction there are very few lightweight options. Consequently, drywall is integrated into the empirical testing of the cited prior art, not only for fire but also for strength. The result is not only heavy and brittle, it is also the antithesis of the original concept. Overcoming this problem requires a solution that is not only fire resistant, but also lightweight and resilient, and more in keeping with the system technology. However, by maintaining the tremendous strength to weight advantage from start to finish, the result is a primary building element, with structural integrity, energy performance, resiliency, and incredible speed and ease of installation, without any rival in the present industry.

The standard practice of molding polystyrene foam is well known. The unexpanded bead material weighs 40 lb/cu.ft and is pre-expanded to 1.0 or 1.5 lb/cu.ft. Pentane is a popular "blowing" agent used to impregnate the polystyrene beads. When molded, the pentane expands to form the cellular structure we recognize as EPS foam. Thus, depending on the desired weight density and assuming the weight of pentane as negligible, the bead volume is expanded anywhere from 26 to 40 times its original volume from start to finish.

Where fire control is important, the polymeric bead formula is chemically modified, or impregnated. The three basic ingredients of fire are: heat, oxygen and fuel. Major EPS bead producers have developed what they call a "modified polymer" which gives off organic or hydrogen bromides which, when heated, create a white cloud of vapor around the surface of the polystyrene foam to inhibit small scale ignition by starving or limiting the contribution of oxygen to a potential fire. However, this does not reduce the melting effect of the bead due to the external heat source, it only inhibits the foam from contributing to it.

The present invention involves the basic molding process, in which a three-dimensional mold of aluminum, for example, forms an enclosed cavity of a predetermined component size. Inside the mold is a corrugated sheet or skeleton structure prime coated with a known heat-activated adhesive. Examples of the adhesive are chloroprene, or a neoprene-based synthetic rubber which is diluted with an aromatic solvent. The cavity is preheated to over 180° F. by steam introduced through a uniform pattern of openings in the walls of the mold. A polymeric bead material is pre-expanded as follows: first, the individual beads are factory impregnated with an expansion or "blowing" agent as for example, pentane, and when heated elsewhere, the pentane expands and is encapsulated in the beads to form a closed cell geometry with a void in the center, then dried to restrain the cell from premature collapse, and then systematically introduced into the mold cavity under moderate pressure of 10–15 psi in another few seconds.

When reheated, the encapsulated pentane filled beads further expand and are compacted and fused to each other in another 5–10 seconds to form the polymeric foam. Pressurized steam is used as the heating agent, re-heating the beads to over their softening point where they begin to fuse together. Simultaneously, the adhesive is activated by the heat, bonding the pressurized beads to the corrugated sheet or skeleton structure. Composite adhesion occurs when the heat and pressure required for the molding process activates a bonding reaction between the adhesive and the plastic. When curing has been completed, no hazard remains from the adhesive system. Then the composite panel is removed from the mold. Some steam moisture remains entrapped and dissipates after two to three weeks, yet as a structural component the panel is completed and ready to carry limited load.

Narrowing the focus to the behavior of the beads, polystyrene foam is considered a liquid with a high viscosity or resistance to flow. It is temperature sensitive, meaning the colder, the harder, the stronger. Technically, deformation starts around 165° F.; bead shrink or 'retreat' along with the delamination of the structure begins around 200° F., but the cellular structure of the bead remains intact up to about 250° F., which establishes the optimum melting or fusion temperature for molding. Thus, complying with the 250° F. unexposed surface temperature requirement of ASTM E119, after 15 minutes of this heat the drywall in the prior art may still be standing but the plastic has long since been degraded, and the capacity of the system as a bona fide bearing wall has been radically reduced. This means that, with fire ratings, even when the panels of the cited prior art are used with drywall, they nevertheless are almost worthless as structural components.

In the present invention, the solution to fire and weight control is chemically interactive. Challenge the surface melting point so that, as the temperature rises, a protective multifunctional 'skin' effectively makes the inside stronger and the outside cooler slowing the bead flow and raising the heat resistance. A resilient membrane wall covering, such as for example a phenolic resin paper, an unfinished fiberglass cloth, or a reinforced pulp paper is bonded to the surface of the polymer core by an adhesive which is activated during molding. But system characteristics of the adhesive not only laminate the membrane to the core, they also take full chemical advantage of the optimum molding heat to form the strongest possible crystalline structural matrix on the bead surface. This encapsulates the peripheral cellular structure, contributes insulative value to the core, slows the melt, inhibits the flow, and ultimately, retards the delamination of the composite. Suggested fire retardant adhesives are PVA (polyvinyl acetate), EVA (ethylene vinyl acetate) or acrylic, but neoprene, urethane or epoxy systems may also be considered, depending on the specific application desired.

Furthermore, the membrane itself may be impregnated with high temperature flame and chemical resistant fibers such as Ryton, Ultratec, Nomexd, Kevlar, PBI, T-84 Polymide, and Kynol Phenolic. Both Kevlar and Nomexd are used in the protective clothing of firefighters, and they are useful in architectural applications such as fireblocking underlayments to increase the ignition resistance of upholstered furniture. Membrane selection may also take into consideration the use of inorganic non-combustible textiles and materials such as beta fiber, e-glass, quartz, carbonaceous residue, carbon, graphite, stainless steel, super alloy, refractory-whiskers, alumuna, zirconia and boron. For our consideration, glass fabrics listed by testing laboratories for use in draperies are woven from uncoated glass yarns which neither burn nor propagate flame. Thus, in addition to cost, the criteria for membrane selection is obviously wide and varied, and task specific.

As a final treatment of the membrane, in addition to the heat-activated adhesive on the inside, the selection itself of a particular material fiber, fabric or paper, and the possible impregnation of that material with an ignition resistant chemical, a thin-film intumescent coating system offers a final frontier of fire protection on the outside of the membrane and, optionally, also on the inside. When exposed to flames or high heat, it has the capability to expand up to one hundred times its dry film thickness, insulate and protect the membrane by limiting the recognition temperature to 200° F., safely below the melt point of the bead. On the inside, the same heat that causes the beads to shrink now causes the intumescent to simultaneously expand. In effect, this neutralizes the creation of voids beneath the membrane with a constrained, insulative material under pressure. In turn, this tends stabilize the shape of the composite, and retard the delamination of the structure.

Therefore, an object of the present invention is to overcome the difficulties of using polystyrene foam in a structural composite, to generate great strength as compared to weight but at the same time harness the control of a material that is difficult to analyze and chemically volatile. But ultimately, the resulting product will become a material with extraordinary properties, great potential, and many unexpected applications, some of which are as follows:

Synthetic Drywall.

The tensile strength of these membranes, if laminated onto opposing surfaces, forms a 'stressed-skin' panel effect which can generate a significant structural value to the composite shape, independent of any internal reinforcing. The most obvious potential here is in the development of a competitive drywall product with an impregnated and reinforced pulp paper surface which can be taped, mudded, sanded and painted (with an intumescent) like convention drywall applications. But with this important advantage. A ½"×48"×96" gypsum board weighs 70 lbs. compared to the stressed-skin polystyrene foam composite which may weigh only 3–4 lbs. The intumescent is 100% water-based, non-toxic, color and gloss specific, and may be prefinished to the membrane. Additionally, it can be applied by spray, brush, roller or automated industrial systems such as coating equipment used in the paper or textile industries. The strength of the lamination and the rigidity of the membrane could be varied to suit specific applications, and reinforcing strips for screws, etc. could horizontally underlay this skin.

Synthetic Wood and Plywood.

In a related shape but with the benefit of internal reinforcing, the structural capability of the 'stressed-skin' effect may also be applied to flat synthetic plywood structural sheets or synthetic wood board stock. Here, an extruded honeycomb, grid or corrugated sheet structure may actually be encapsulated within the body of the core material to the point where it breaks the continuity of the plastic foam. If the encapsulated structure is polymeric, it may additionally be thermoformed into the body of the composite in a continuous manufacturing process. Then, a chemically compatible heat-activated adhesion, or an additive heat-activated adhesive would simultaneously bond the core, honeycomb and surface membranes together into one unit during the molding process, and effectively produce a material with the homogeneous stress characteristics of an ideal structural material, with identical physical behavior at all points. Contingent on the protection of an intumescent finish, this material could then be saw cut, nailed, glued and painted in ways similar to the conventional materials it would replace.

Columns, Beams and Trusses.

The loading of the composite material according to the invention is similar to the principles of reinforced concrete, with three exceptions. First, no primary credit for compressive or tensile strength can be given to the plastic foam core material, only secondary lateral bracing assistance. Second, regarding the skeleton structure only a plurality of light gage members will relate to the properties of the foam core, but in order to amplify the composite strength their quantity may be greatly increased. And with regard to the corrugated sheet structure, the thickness, curvilinear profile and molecular characteristics are all controllable entities, and establish the composite density and component strength. Third, strength in tension can be accomplished by either the embedded members themselves or independent threaded rods or cables, using a post-tensioning system through pre-molded conduits. And in general, the selection of member size, shape and internal configuration will totally depend on the anticipated forces acting on it. Pursuant to this, sheet or skeletal members trace continuous lines of force along the longitudinal axis, with the embedded material concentrated away from the neutral axis to match locations of extreme fiber stress in bending. Then, by direct tactile contact independent of the polymer, these lines of force must become integrated with connector devices at composite extremities which receive loads, transfer the loads to the skeleton, and channel and collect them at the other end for transfer to an external support.

Mobile Maker.

Considering the relatively modest temperatures, pressures and associated environmental requirements for manufacturing this composite material, it is quite feasible to densify the organization of equipment into a mobile unit, perhaps even a vehicle. At the beginning of the process, the high performance material of the present invention starts out in a semi-rigid state as continuous wire, ribbon or sheet, on spools or rolls, which is a very compact and densified means of storage, and lends itself to automation. The expanded foam product starts out densified as well, in the form of tiny beads that will expand 26–40 times original size. The manufacturing process involves a heated vessel to pre-expand the beads and create voids inside, and molding at temperatures in the 200–250° F. range. With no other environmental conditions outside the mold cavity to be satisfied, this whole process of component prefabrication could be compacted and take place on-site in a trailer. The entire composite as building structure, insulation, vapor barrier, floor, wall and roof sheathing is produced quickly and efficiently, with very little equipment, not too sophisticated or difficult to run, eliminating the cost and delays of freight, scheduling and storage. A tractor trailer carrying a cubic yard of unexpanded beads, a roll of sheet material or a coil of strong ribbon, a pre-expander and a mold can be driven onto a construction site by a driver and a technician, and in two days they can expand the beads, insert the ribbons, mold the product, and assemble the essence of a 2500 sf house. And for efficiency, production can start en route, like a concrete truck starting its mix by rotating the barrel while the vehicle is moving.

And finally, with regard to the production of a synthetic homogeneity, the prior art has demonstrated great strength in the structural lamination of light gage steel and plastic foam. The present invention intends to formulate this behavior, mathematically, by comparing the contrasting properties of rigid and resilient materials. The high performance material may either be a stressed-skin membrane, a corrugated sheet or an elongated skeleton structure of any composition including, but not limited to, steel, fiberglass or solid polystyrene resin. As a time-tested composite, the mechanics of reinforced concrete could normally be used as a guide in that their contrasting structural properties are accumulative. But with the polymeric foam, nothing relates. The physical differences between rigid and resilient materials are not comparable to each other, and therefore not accumulative. In the present invention, when the encapsulated material is a solid polystyrene resin, it may have a tensile strength of 7–9000 psi and a compressive strength of 15–20,000 psi, but the foam is still incomparable. The adherence between these two polymeric forms is very compatible, but their respective melt points must be adjusted to allow the rigid material to retain its physical characteristics during molding temperatures. In the cited prior art of steel and foam for example, their weight per cubic foot is 490 lb. for steel vs 1.5 lb. for EPS, the compression is 38,000 psi for steel vs. 22 psi for EPS (@10% deformation), and the coefficient of expansion/per 1° F. temperature for steel is 0.0000065 in. vs. 0.000035 in. for EPS. In the physical sciences, it is clear that the resultant stress or strain due to several forces in any system is the algebraic sum of the effects caused by these individual forces. Here, the EPS is far too resilient to be additive to the opposite characteristics of the steel, but there are additional indeterminant forces at work on it nevertheless. The tensile and compressive strength of the adhesive as well as that exhibited by the uniform pressure of the encapsulative foam work, albeit in secondary ways, on the steel as well.

Consequently, because of the inequities as well as the indeterminants, working formulas can only be based on observation, or empirical testing. However, as opposed to the prior art where the analysis was on the composite configuration, in the present invention the tests will be on the performance of varying densities and distributions of structural members with known characteristics, encapsulated in polystyrene foam densities also with known characteristics, and the results will be tabulated into functionally certifiable standards of material behavior. From these standards, reliable stress characteristics can be calculated from which reliable mathematical analyses, or formulas, can be drawn.

Summarizing the description of the invention above, it has been discovered that expanded plastic can be used structurally. Here, for example, rigid and resilient materials are bonded together to form solids of great strength and light weight, with ultra high performance and low cost. In association with an adhesive, expanded plastic foam provides the shape and the lateral support that generates maximum strength and efficiency from a minimum use of high performance material. Of major significance is the strength to weight ratio, opening a new realm of design possibilities for the architect. In the prior art, the composite structure is only used two-dimensionally, imitating conventional construction rather than in pursuit of its own identity, but now molding technology facilitates complete three-dimensional form capability regardless of scale. This translates into the prefabrication of whole room-sized building components which can be lifted by fork lift instead of a crane. The difference in the rent as well as the agility of these two pieces of equipment is ten-fold, implying the first real opportunity to construct entire buildings out of prefabricated modules. This new material is at least 100 times lighter than reinforced concrete, hence the average Expo '67 module weight would be reduced to only one ton, with a vast array of intrinsic environmental qualities, and a great resiliency in lifting enhanced by the polymeric matrix. Thus, with a strength that rivals reinforced concrete coupled with a weight that allows longer spans, greater cantilevers, and all the ramifications this new technology implies, the whole concept of 'building mass' will take on a different dimension, and finally, perhaps, signal the dawn of a new era in modular construction.

BRIEF DESCRIPTION OF THE DRAWINGS

FIG. 13 is a composite panel similar to that shown in FIG. 9, emphasizing end returns.

FIG. 14 is a left-hand support for the FIG. 13 beam, shaded area indicating embedment.

FIG. 15 is a right-hand support for the FIG. 13 beam, shaded area indicating embedment.

FIG. 16 is a perspective of a beam-shaped composite, with emphasis on the cross-section showing rarefied and densified wire configurations, and a rigid endwall grid about which to interlace the wires.

FIG. 17 is a diagrammatic outside view of an endwall grid, showing conditions of interlaced ribbons and wires FIG. 18 is a cross-section of FIG. 20, showing interlaced conditions, and a solid cover.

FIG. 19 is an isometric of a rectangular composite, showing a folded network of woven wire mesh inside.

FIG. 20 is an isometric of a cylindrical composite, showing a scrolled network of woven wire mesh inside.

FIG. 38 is an exploded view of a three-dimensional mold system, including a skeleton structure 'french-fry basket' insert.

FIG. 39 is a cross-section through the three-dimensional mold of FIG. 38.

FIG. 40 is a wall section, showing the technique of joining two three-dimensional moldings of FIG. 38.

FIG. 45 is a plan view of flat pre-folded 'accordian-type' structural insert.

FIG. 46 is a perspective of unexpanded 'accordian-type' structural insert.

FIG. 47 is a perspective of 'accordian-type' structural insert beginning to be expanded FIG. 48 is a perspective of 'accordian-type' structural insert almost to full extension, shown within a dashed columnar mold shape.

FIG. 49 is a perspective of a completed composite with one pattern of expanded structural inserts set in the molding form.

FIG. 50 is a plan view of a space frame structure with collars interlocking four major columns.

FIG. 51 is a perspective of a space frame structure with collars interlocking four major columns, showing lifting devices on each collar and a movable crane boom in the center of the space frame.

FIG. 52 is a partial section cut through eight levels of three-dimensional modules which are suspended in four-floor sections immediately below the space frame.

FIG. 57b is a cross-section of the in-line mold casing, sized to receive the corrugated sheet of the thermoform device of FIG. 57a.

FIGS. 58a–58j are sequentially arranged together to illustrate a linear manufacturing process to thermoforming semi-rigid sheet material, followed by foam molding and lamination.

FIG. 58a is roll storage of a semi-rigid sheet material, with an optional roll indicated.

FIG. 58b is infra-red heating of the sheet material.

FIG. 58c is the adjustable roll-form device.

FIG. 58d is a multi-zone for the simultaneous annealing and cooling of the formed product, with infra-red heatering above and squirrel cage fan blowers below.

FIG. 58e is a prime coating zone.

FIG. 58f is a laminate integration zone, showing the respective top and bottom sheet roll storage and prime coating zones on line to guiding rubber draw rollers with the formed product in-between.

FIG. 58g is alternate to FIG. 58f where, in lieu of molding, the top and bottom sheets are laminated directly to the corrugations, wherein polymeric foam and infra-red heat are synchronistically introduced directly into each and every corrugated cell just prior to being compressed by the laminating rollers.

FIG. 58h is a shear device either for cutting sheets prior to molding as per FIG. 58f, or cutting finished composite sections formed up line in FIG. 58g.

FIG. 58j is a mold casing similar to that of FIG. 57b, with associated feed source tanks for polymeric material, steam and vacuum.

FIGS. 59a–59e are grouped together to illustrate a panel interconnection system for the mold form of FIG. 57b, requiring mechanical fastening between composite sections.

FIG. 59a is a left jamb channel frame.

FIG. 59b is a complete panel interlocked between other panels.

FIG. 59c is a right jamb channel frame.

FIG. 59d is the butt-end channels interlock of two unmating panels.

FIG. 59e is a corner post channel interlock.

FIGS. 60a–60e are grouped together to illustrate a panel interconnection system for an optional thermoform corrugated shape and channel frame, as a self interlocking snap-in system requiring no mechanical fastening between composite sections.

FIG. 60b is a complete panel interlocked between other panels.

FIG. 60c is a right jamb channel frame.

FIG. 60d is the butt-end channels interlock of two unmating panels, with spacers.

FIG. 60e is a corner post channel interlock, with spacers.

DESCRIPTION OF PREFERRED EMBODIMENTS

The scope of the present invention is to create a fire resistant and homogeneous laminated composite building material, comprising the lamination of rigid and resilient materials under conditions of heat, pressure and the constriction of a mold, that generates a synthetic homogeneity for reliable structural analysis. The rigid material, as the primary high performance structure capable of sustained stress, is either laminated to the surface of the composite as a stressed-skin membrane, or encapsulated within the body of the core as a corrugated sheet or skeleton structure that is bonded to and laterally braced by the resilient material. As a surface laminate, the membrane may also be fire resistant. As a corrugated sheet, it may also be thermoformed and integrated into the body of the composite in a continuous manufacturing process. And, as a skeleton, its structure may be a plurality of high strength elongate members arranged in parallel according to anticipated axial stresses. The resilient material may be an expanded polymeric foam, and the rigid material may be anything ordinarily associated with the high tensile and compressive properties of structural components in building construction. Rigid members may also be placed along the outer edges of the molded formations in order to maintain dimensional stability after cooling. The resulting composite is strong, lightweight, moisture resistant and economic, and therefore suitable for custom and generic prefabrication not only as floor, wall and roof panels, or columns, beams and trusses, but also as synthetic board stock, drywall, plywood and even reinforced concrete.

In the illustrations of the patent to follow, most of the embodiments depicted herein relate more to the practical than the ideal, the shape more than the symbiosis, but it is important to recognize that this is the evolution of a material, not the imitation of a form. Pursuant to that, the principles of encapsulation and homogeneity remain realistic throughout. Also, for purposes of clarity, the minimal size, placement and plurality of the elongate skeletal structural members may seem contradictory to the principles of homogeneous distribution, but the pervasive spirit and intent is nevertheless there. One must also assume that, if a mold is shown, it is an abstraction but able to withstand the effects of heat, pressure, separation, and the interpenetration of its shell thickness by relatively thin gage material. Additional experience in molding has indicated that when expanded polymeric material is removed from a mold, its dimensional stability has a tendency to slight contraction as it cools. Thus, although not proprietary to the present invention because it is already in the state of the art, surface laminated edge strips along the entire perimeter of the finished composite shape should be assumed as an integral part of the finished prefabrication process here.

Figure 1:
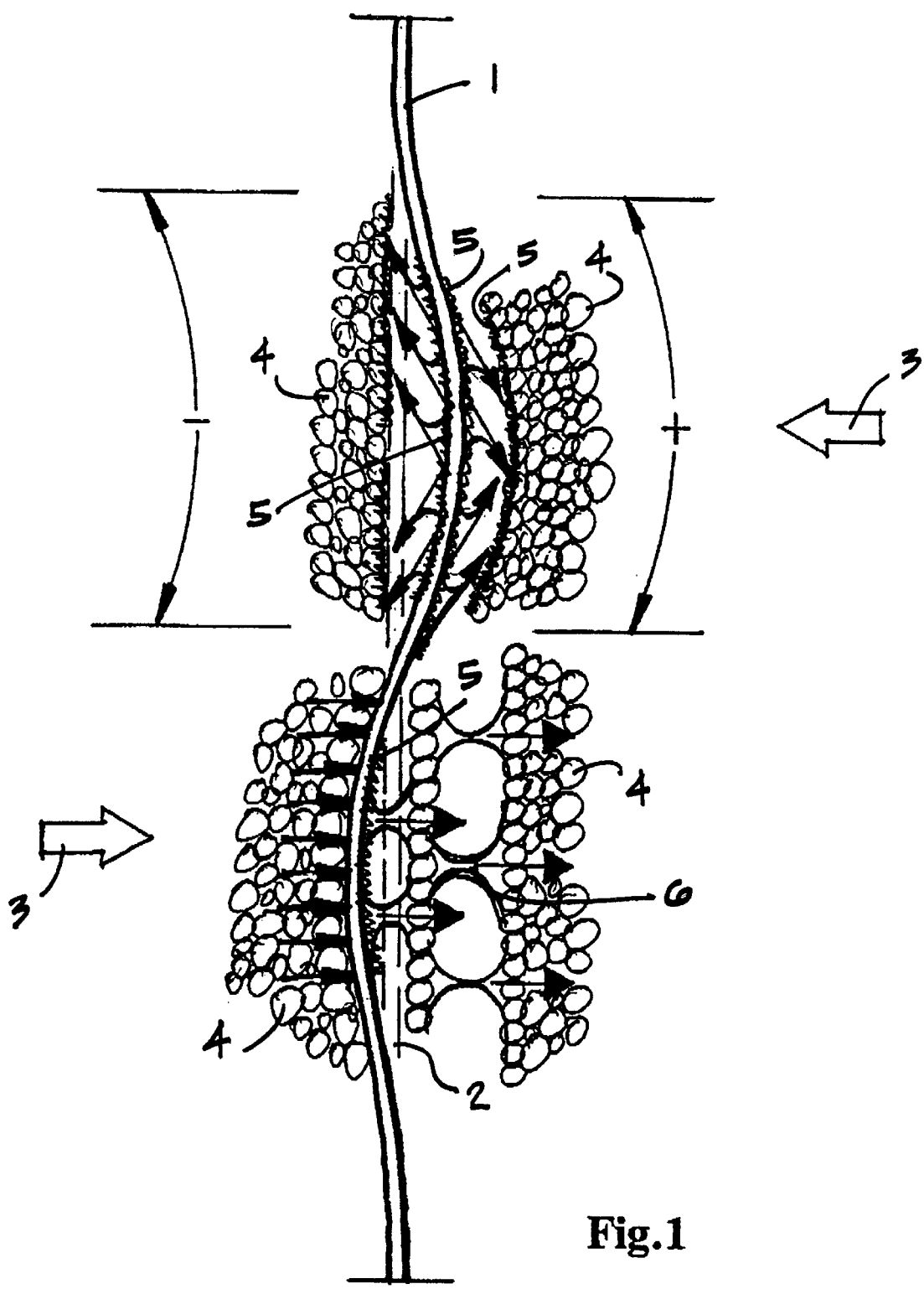
FIG. 1 is a magnified close-up of the laminate action between a wire and the polymer.

FIG. 1 shows a magnified cross-section of a wire or ribbon 1 made of steel, for example, acted on by the combined forces of the pressure of the encapsulate and the adhesion of the bead. Dashed lines 2 indicate the normal unloaded position of the member, and the wavy curve indicates the initial tendency toward failure due to buckling when the elongate member is subjected to the force of compression. Large horizontal arrows 3 indicate the reaction of the composite to restabilize the ribbon or wire. In the lower portion, with the wire bowing left, the individual polymeric beads 4 which were densified at molding exert compressive resistance against the inclination of the wire to move left. On the opposite side of the wire, an adhesive 5 which was originally prime coated to the wire and then heat-activated during the molding process exhibits bead to steel tensile force which is backed up by the tensile force 6 of molecular bead to bead adhesion, both joining to pull the wire back to the vertical position. The upper portion of this illustration is meant to show the reactive forces of shear acting to stabilize the wire in the vertical position, with the wire bowing to the right, the "+" and "−" signs refer to actual expanded and compacted wire circumference dimensions. On the left side of the wire, within the body of the adhesive 5 itself there is a tensile resistance between the adhesive on the bead 4 and that on the wire 1 to straighten it. Conversely, on the right side the forces within the adhesive 5 tend to resist being expanded due to the effects of the bending wire 1.

Figures 2, 3:
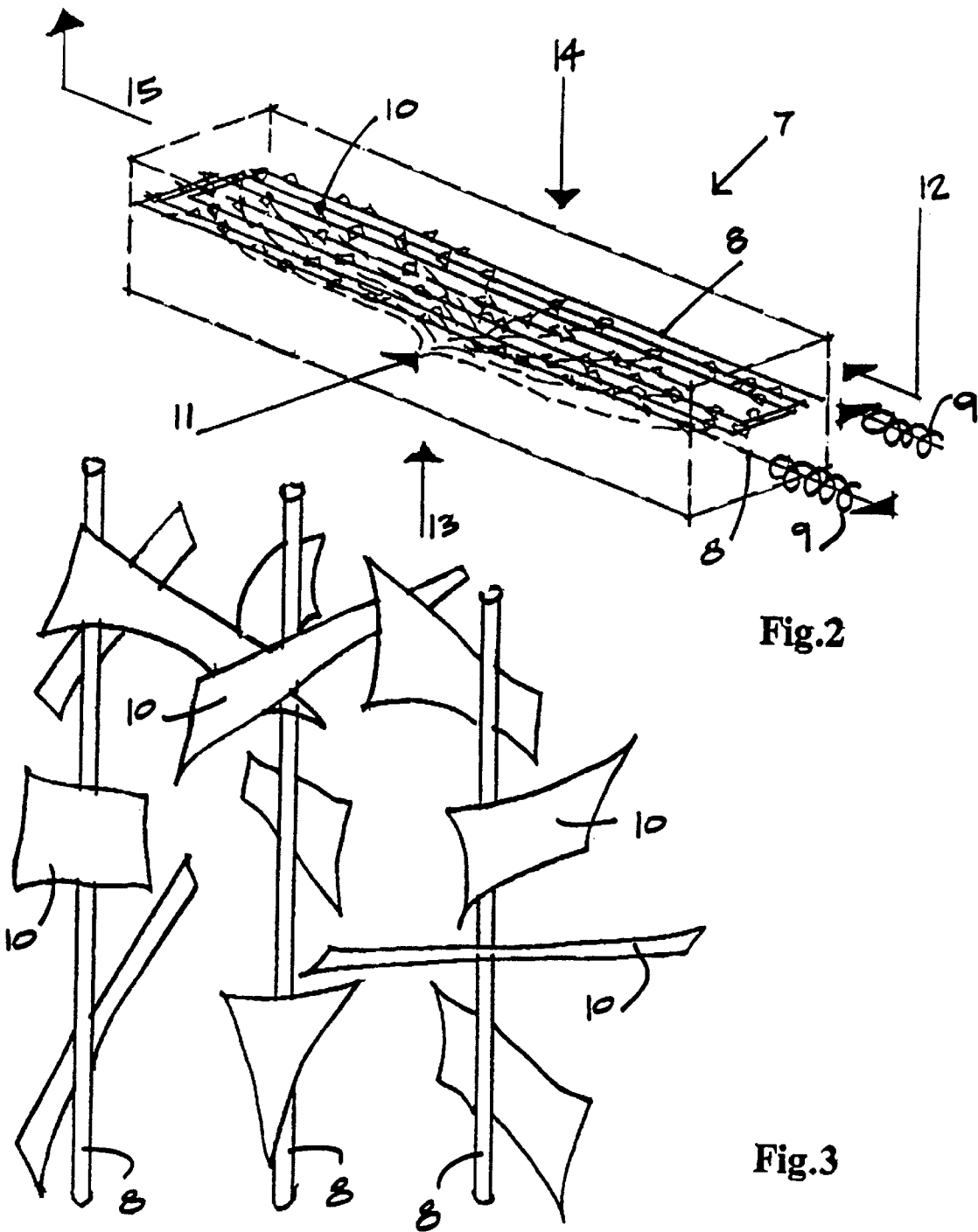
FIG. 2 is an illustration of a continuous winding which if subjected to an electric current could create a magnetic field to attract a uniformly dense arrangement of structural material debris.
FIG. 3 is a magnified close-up of axial wires, with structural debris arbitrarily adhered.

In FIG. 2 a beam-shaped molding 7 shown by the dashed lines encompasses a continuous coiled wire 8, ultimately suitable for encapsulation in the molding process. Arrows 9 at the right end of the coil indicate possible electrical connection to coil extremities, to allow an electric current induced in the wire to create an electromagnetic effect out of the entire mold cavity. The purpose would be to magnetize the wires in order to attract small pieces of structural material debris 10 to automatically become adhered to the wires if introduced into the cavity of the mold, but this can also be done by ordinary gluing procedures. The object is to gain additional resistance against buckling, by temporarily adhering debris to the wires, then prime coating both with a heat-activated adhesive, followed by the simultaneous encapsulation and bonding process of molding. Note this illustration does not indicate the mold casing itself, but the beam shape is representative of the casing and is surrounded by arrows. The horizontal arrow 11 is an inlet for the structural debris to be introduced into the mold cavity, followed by arrow 12 which is the inlet for expanded plastic beads. Arrows 13 and 14 are steam inlets, and arrow 15 is either a vent or a vacuum port to assist in the drawing in of the beads or the densification process. FIG. 3 is a magnified view of the coiled wires 8 with structural debris 10 arbitrarily adhering to the wire network.

Figure 4:
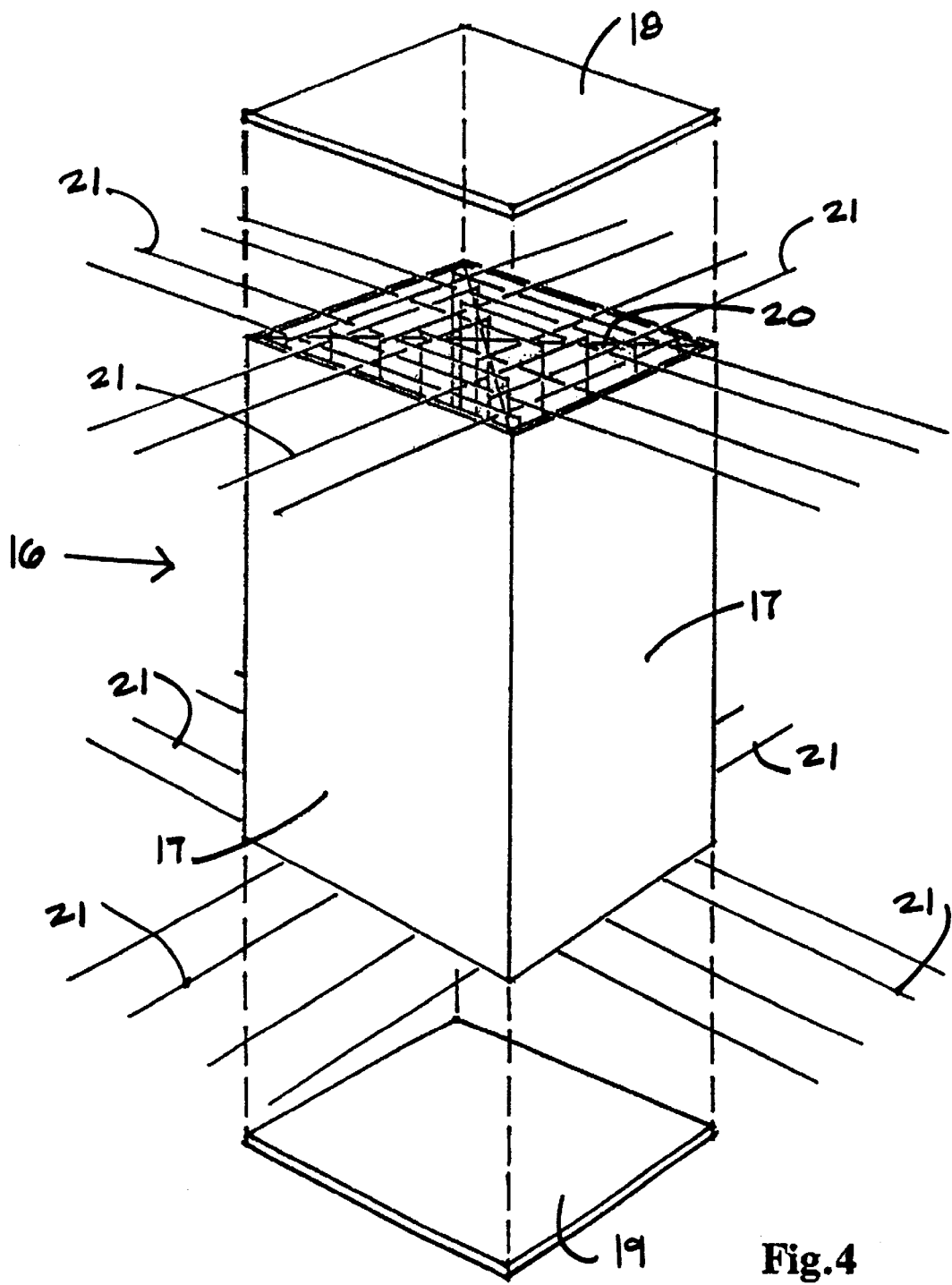
FIG. 4 is a mold with separable top and bottom sections, showing wires systematically interlaced and integrated into and through the cavity of the mold across diagonal cross wires at the ends.

FIG. 4, in pursuit of homogeneity, shows a mold 16 consisting of four connected sides 17, and separable top 18 and bottom 19, with diagonally crossed wires 20 stretched across opposing open-ended sections of the mold, and a systematic configuration of wires 21 interlaced about each other and about the diagonal cross wires before entering and exiting the cavity of the mold. For purposes of clarity, a minimum density of wires is shown in order to make the pattern of interlacing more obvious, but the actual quantity required will be markedly higher. The wires emanating from the mold perpendicular to each of the four side planes facilitate not only the pattern of interlacing but also an systematic method of wire feeding by spools, conveniently located adjacent to the sides of the mold. But an alternate direction could be along the longitudinal axis. However, developing an interlaced "fabric" of wires across the open-ended sections of the mold facilitates two things: first, the closure of the mold with said top 18 and bottom 19 sections as pneumatically complete cavities and, second, the opportunity to provide an alternately effective air-tight enclosure through the application of a synthetic resin which would rapidly harden to a solid end closure, and remain a permanent part of the molded product. Additionally, such end form condition would tend to accomplish a positive transfer and collection of incremental forces anticipated in the wires.

Figure 5:
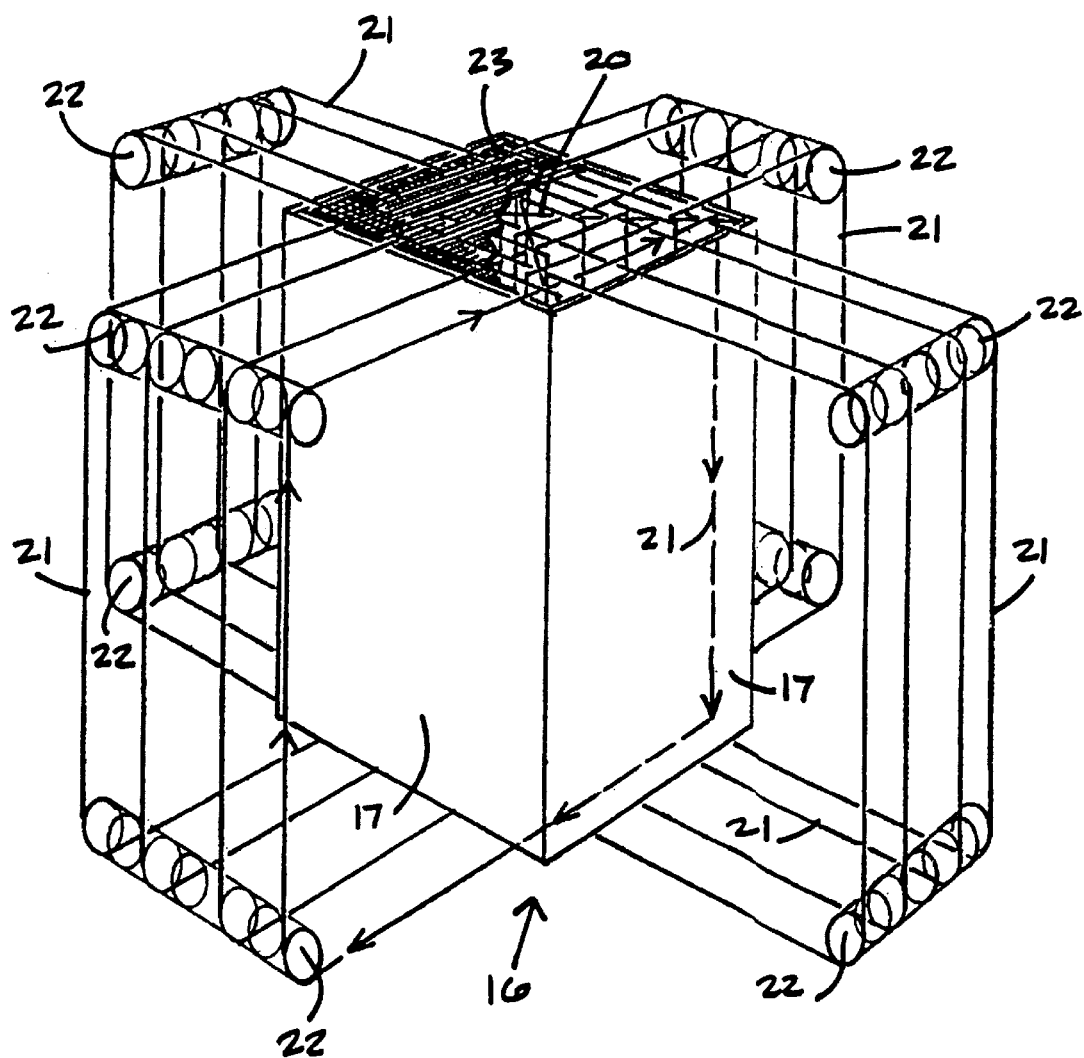
FIG. 5 is similar to FIG. 4, showing continuous wire spool feed system and partial synthetic resin closure over interlaced pattern at top opening
Figure 6:
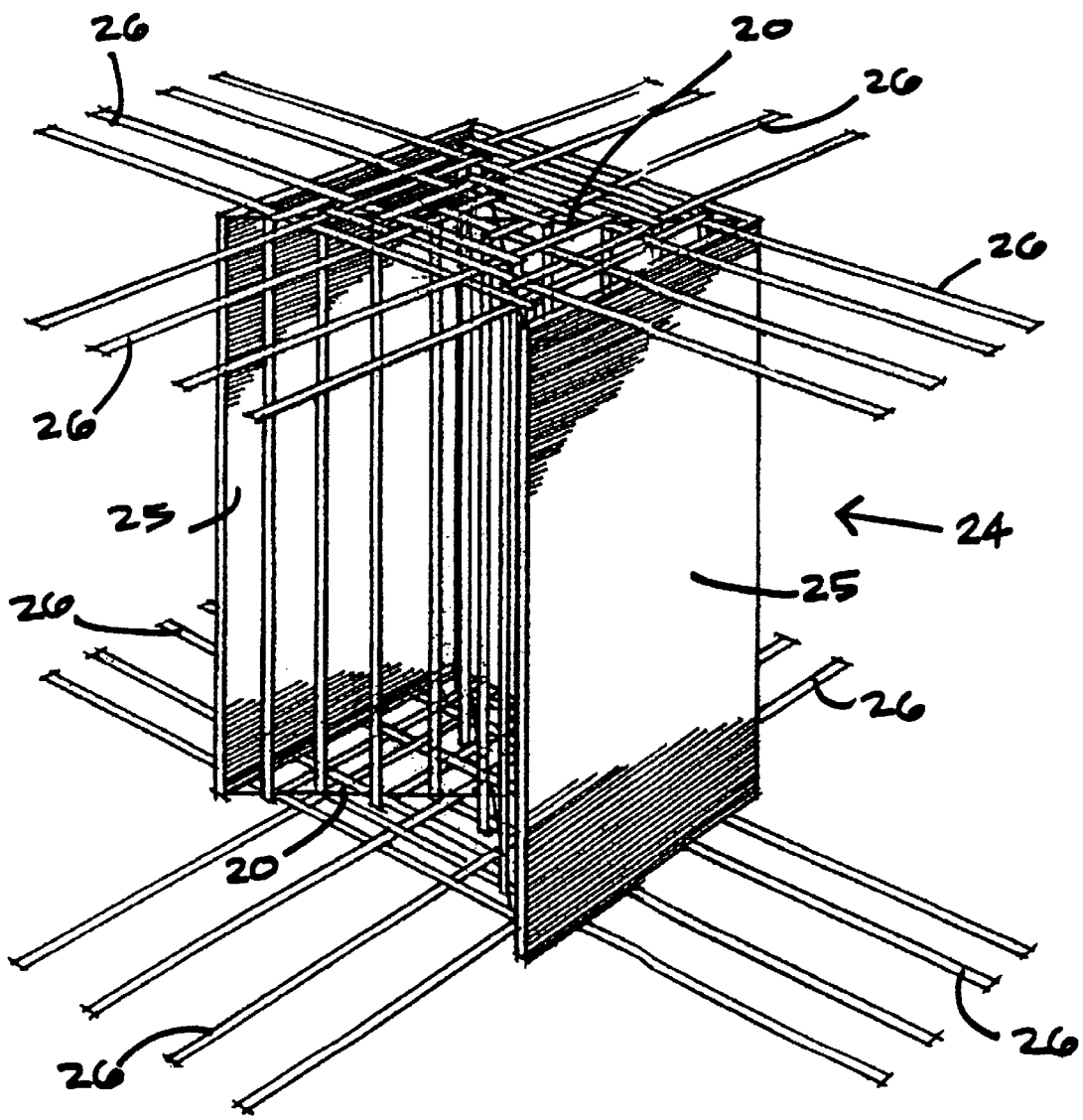
FIG. 6 is a mold with separable top, bottom and one side sections, showing ribbons systematically interlaced and integrated into and through the cavity of the mold across diagonal cross wires at the ends, exposing the interior mold cavity and thereby showing correspondingly interlaced relationships with opposing end sections.

FIG. 5 is similar to FIG. 4 but is meant to show an automated wire system of spool feeding, with the mold 16 consisting of four connected sides 17, diagonally crossed end wires 20, showing continuous wire 21 being distributed by a system of spools 22 which could be computer instructed for automation purposes. The structural elongate member to be encapsulated in the core does not have to be wire or ribbon, but these shapes although normally weak against lateral force do have the advantage of compactness and convenience for fabrication. But bent shapes could be substituted, although insertion would have to be manual. Finally, a synthetic resin closure 23 in partial view is shown over interlaced pattern at top end opening. Its purpose is two-fold: to hermetically seal the opening and complete the definition of the mold cavity despite the interpenetration of all the wires, and also to become a permanent end plate for bearing purposes once the finished composite is removed from the mold. This is only one solution, however, as others are a liquid/solid end cap controlled by temperature and 100% recyclable, and intermeshing hard forms which in effect telescope down to the miniature size of the wire openings. FIG. 6 shows a mold 24 similar to the mold 16 but consisting of only three connected sides 25, with both ends and one side open, diagonally crossed wires 20 stretched across each open-ended section of the mold, and a systematic configuration of ribbons 26 which follow the pattern that mold 16 exhibits. The purpose here is to show that opposing ends of a mold shape can be the corresponding location of interlaced material to develop the state of being a "fabric", to which a viscous substance could be applied and adhered to, to become, effectively, a closure element.

Figures 7, 8:
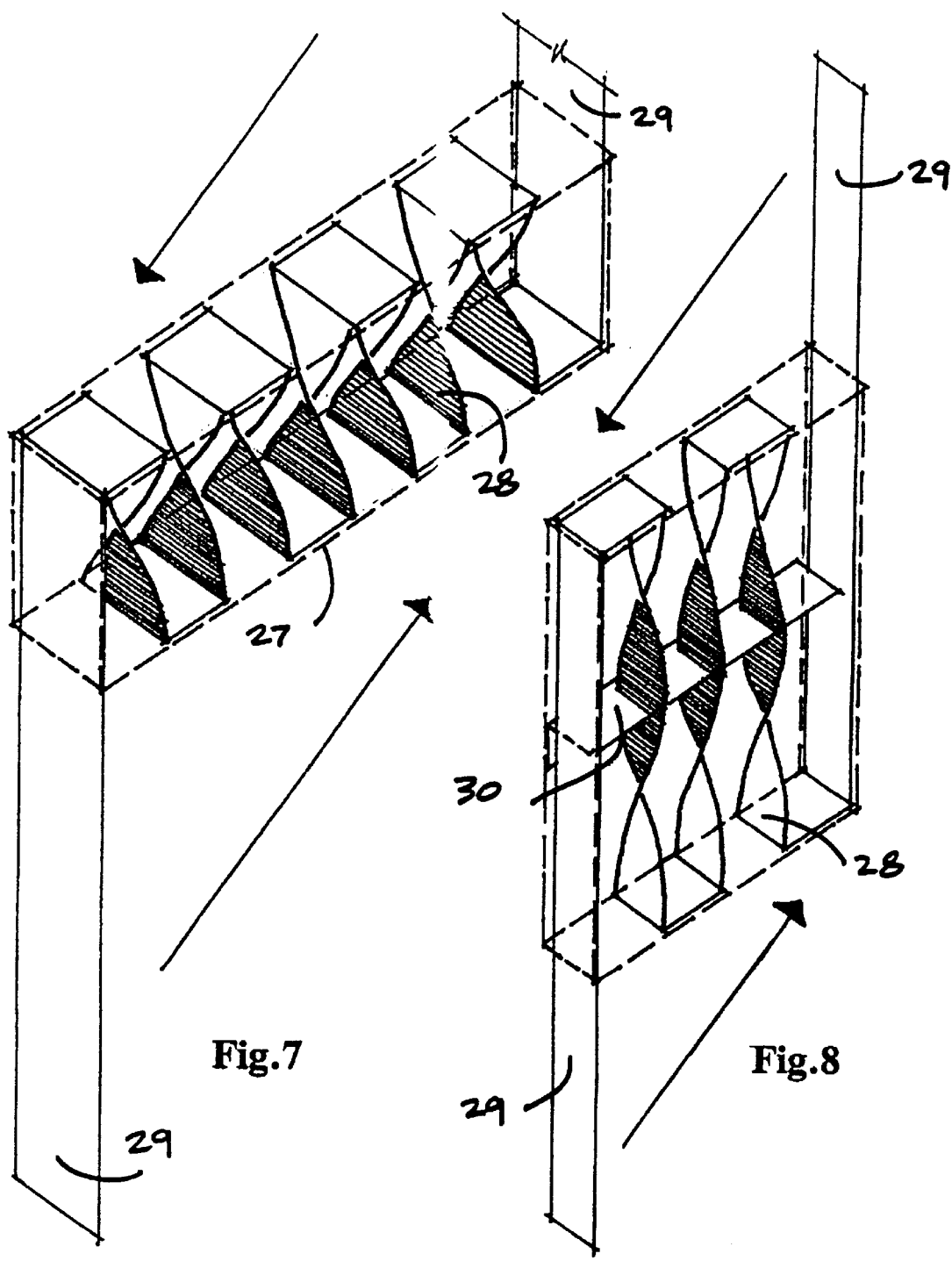
FIG. 7 is a perspective of a rectangular beam-shaped composite, with a systematic pattern of twisted ribbon within the core, and extremity extensions beyond to be folded back and fastened to the exposed ribbon network.
FIG. 8 is a perspective of a planar panel-shaped composite, with a pattern of twisted elongate ribbon sections, requiring several twists and cut and bent transverse ribbon braces, and extremity extensions beyond to be folded back and fastened to the exposed ribbon network.

FIG. 7 is a perspective of a rectangular beam-shaped composite 27, with a systematic pattern of twisted ribbon 28 within the core, and extremity extensions 29 beyond to be folded back and fastened to the exposed ribbon network. Arrows indicate the directions of folding. It should be noted here that these ribbon extensions 29 not only facilitate a strong unit, but also are absolutely strategic in their location along the composite perimeter to prevent shrinking of the core material as it cools after removal from the mold. In many cases shown here, these perimeter members are neither shown nor discussed, but in no way should that diminish their critical importance to the maintenance and control of the molded forms and actual interactive use with other component forms. In fact, all component forms should have surface laminated perimeter members, continuous along all outside edges of the composite material. FIG. 8 is a perspective of a planar panel-shaped composite, with a pattern of twisted elongate ribbon sections 28, requiring several twists, and cut and bent transverse ribbon braces 30, and extremity extensions 29 beyond, to be folded back and fastened to the exposed ribbon network.

Figure 9:
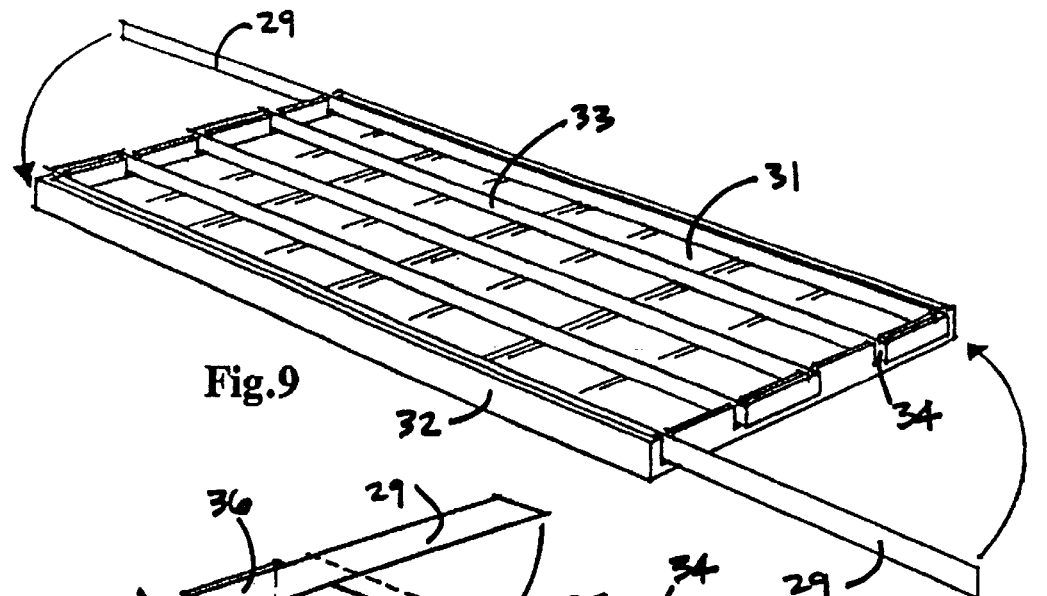
FIG. 9 is a planar mold cavity bottom and sides, showing continuous ribbon pat terns penetrating out of and returning into the mold cavity through slots cut into the panel end walls, with opposing edge strips extended beyond the mold form, to be folded back and fastened onto exposed end sections of ribbon material.
Figure 10:
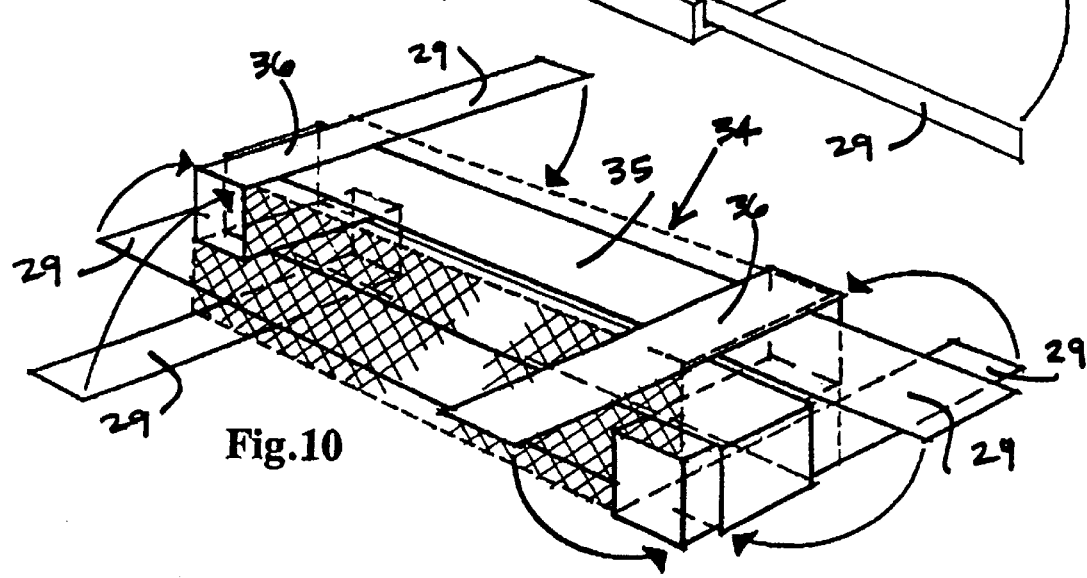
FIG. 10 is a perspective of a beam-shaped mold, showing ribbon material configurations weaving into and beyond the mold cavity, to be folded and fastened around its perimeter.
Figure 11:
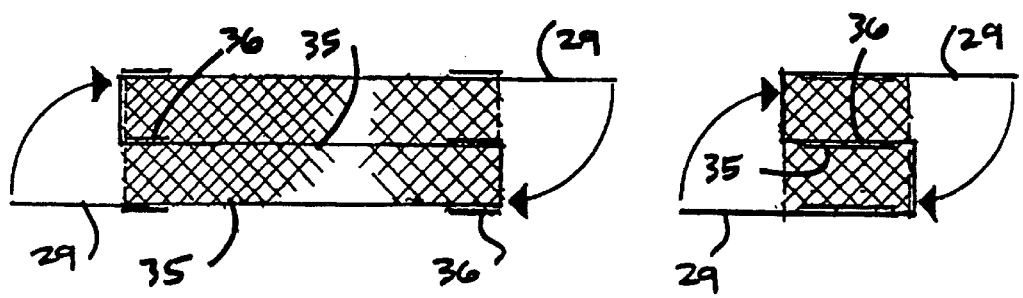
FIG. 11 is a longitudinal section of FIG. 10, showing directions for ribbon folding.
Figure 12:
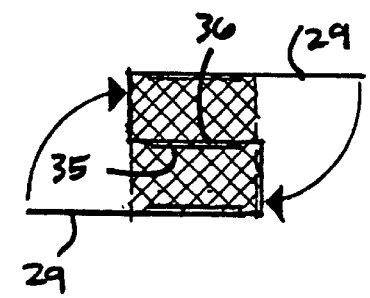
FIG. 12 is a transverse section of FIG. 10, showing directions for ribbon folding.

FIG. 9 is a planar mold cavity bottom 31 and sides 32, showing continuous ribbon patterns 33 penetrating out of and returning into the mold cavity through slots 34 cut into the panel end walls, with opposing edge strips 29 extended beyond the mold form, to be folded back and fastened onto exposed end sections of ribbon material. FIG. 10 is a perspective of a beam-shaped mold 34, showing longitudinal ribbon material configurations 35 and transverse configurations 36 weaving into and beyond 29 the body of the mold, to be folded and fastened around its perimeter, and connector ribbons 36 similarly fashioned at opposing beam ends. FIG. 11 is a longitudinal section of FIG. 10, showing directions for ribbon 35 folding interlaced with ribbon 36 with extensions 29 to be folded back. FIG. 12 is a transverse section of FIG. 10, showing directions for ribbon 36 folding interlaced with ribbon 35 with extensions 29 to be folded back.

FIG. 13 is a composite panel 37 similar to that shown in FIG. 9 with continuous ribbon patterns 33 interspersed within the body of the composite, emphasizing end returns 38. FIG. 14 is a left-hand support 39 for the FIG. 13 beam-shape, shaded area 40 indicating embedment in an adjacent (undefined) structural member. The upturned part 41 unites with the end return 38 for a positive connection. FIG. 15 is a right-hand support 42 for the FIG. 13 beam, shaded area 40 indicating embedment in an adjacent (undefined) structural member. The upturned part 43 unites with the end return 38 for a positive connection. FIG. 16 is a beam-shaped composite 44, with emphasis on the cross-section showing rarefied and densified wire configurations 45, and a rigid endwall grid 46 about which to interlace the wire or ribbon material (not shown). FIG. 17 is a diagrammatic outside view of an endwall grid 46, showing conditions of either interlaced ribbons 33 or wires 21. FIG. 18 is a cross-section of FIG. 17, showing either the ribbons 33 or the wires 21 interlaced within the endwall grid 46 to establish a flat surface over which a solid cover 47 could be applied for purposes of mold closure. FIG. 19 is an isometric of a rectangular composite 48, showing a folded network of woven wire mesh 49 inside.

FIG. 20 is an isometric of a cylindrical composite 50, showing a scrolled network of woven wire mesh 49 inside. In both of these figures, the intent is to illustrate convenient and practical introductions of axial wire, with systematic attachment of lateral bracing, into these two basic columnar shapes.

Figure 22:
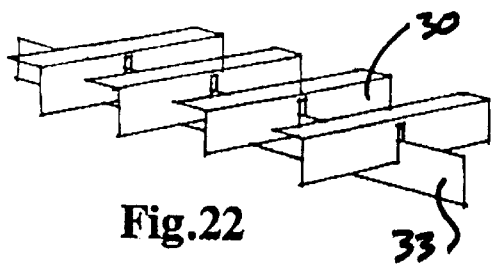
FIG. 22 is an isometric of uncut axial ribbons spliced with cut and bent transverse ribbons
Figure 21:
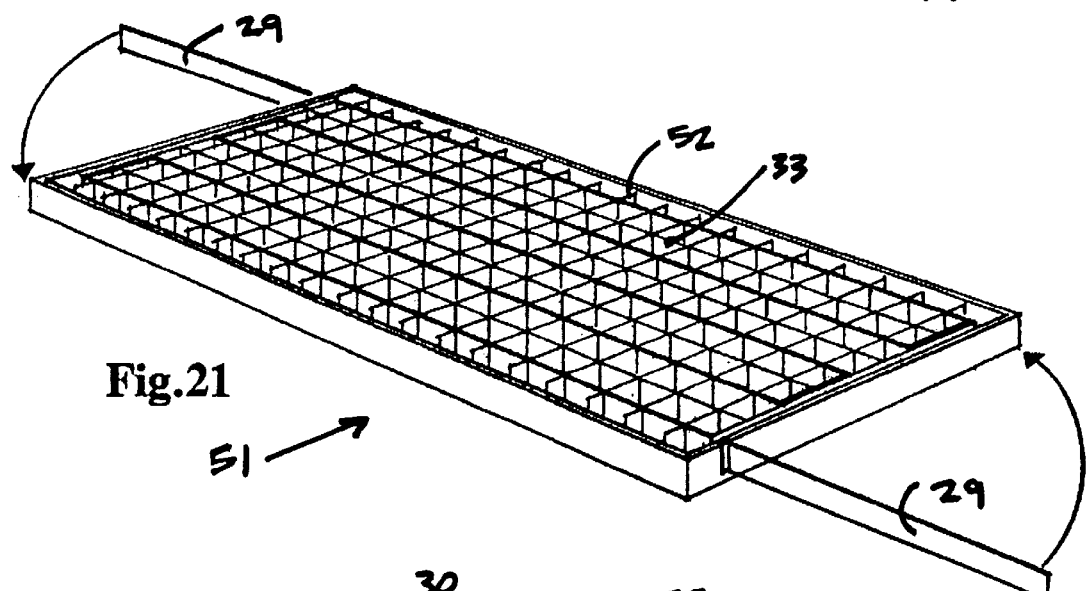
FIG. 21 is a planar mold cavity bottom and sides, showing a configuration of axial and transverse ribbons, equally cut and spliced together similar to an 'ice-cube tray' configuration.

FIG. 21 is a planar mold cavity 51, comprised of bottom and sides, showing a configuration of axial ribbons 33 and transverse ribbons 52, equally cut and spliced together similar to an 'ice-cube tray' configuration, with extensions 29 to be folded back and fastened to the exposed ribbon network after the mold casing is removed. FIG. 22 is an isometric of uncut axial ribbons 33 spliced with cut and bent transverse ribbons 30.

Figure 23:
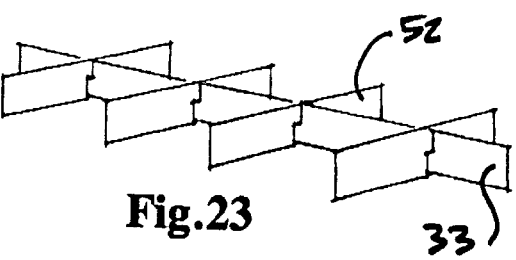
FIG. 23 is an isometric of axial and transverse ribbons, equally cut and spliced together as shown in planar mold cavity of FIG. 21.
Figure 24:
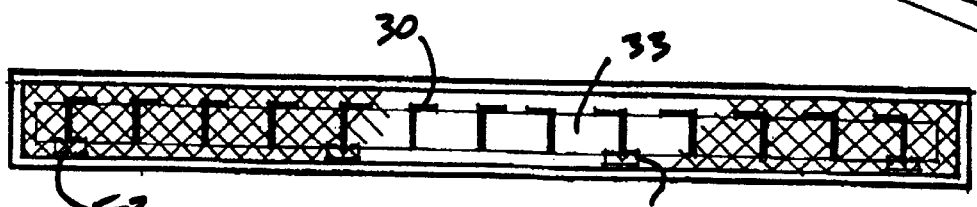
FIG. 24 is a longitudinal section of a mold similar to FIG. 22, showing a configuration of uncut axial ribbons spliced with cut and bent transverse ribbons, and 'shoe' supports.
Figure 25:
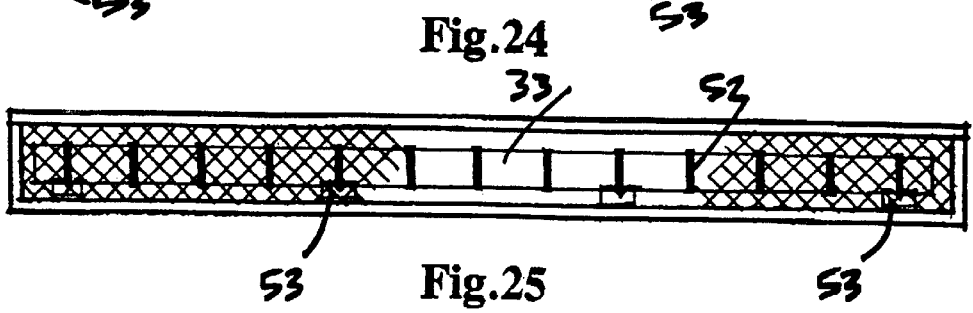
FIG. 25 is a longitudinal section of FIG. 21, showing a configuration of axial and transverse ribbons, equally cut and spliced together, and 'shoe' supports for the assembly.
Figure 26:
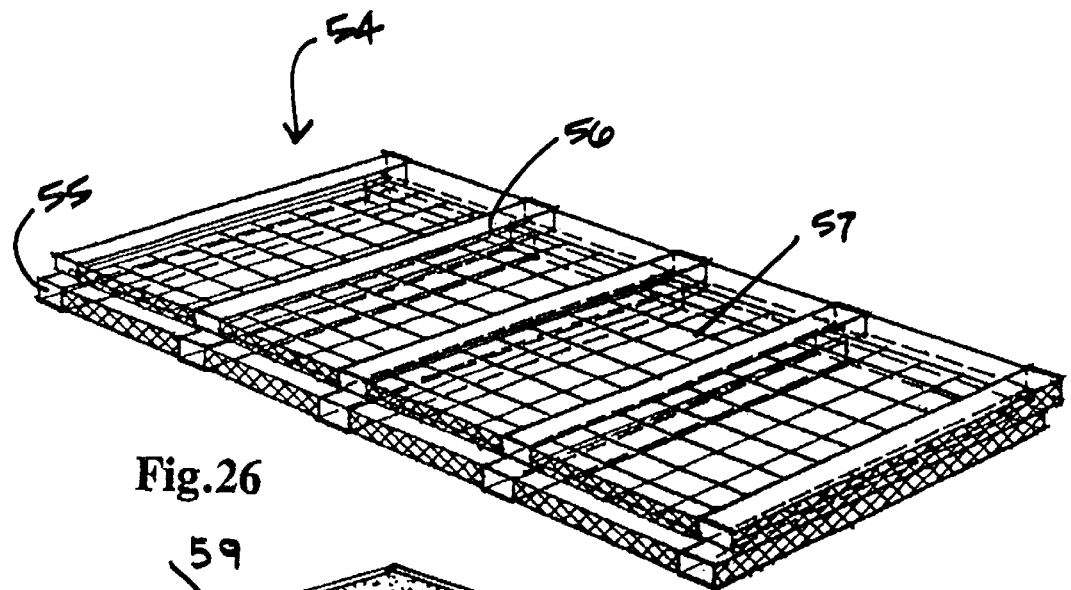
FIG. 26 is a perspective of a planar structural configuration with shiplap side edges, showing a combination assembly of transverse ribbons integrated with woven wire mesh
Figure 27:
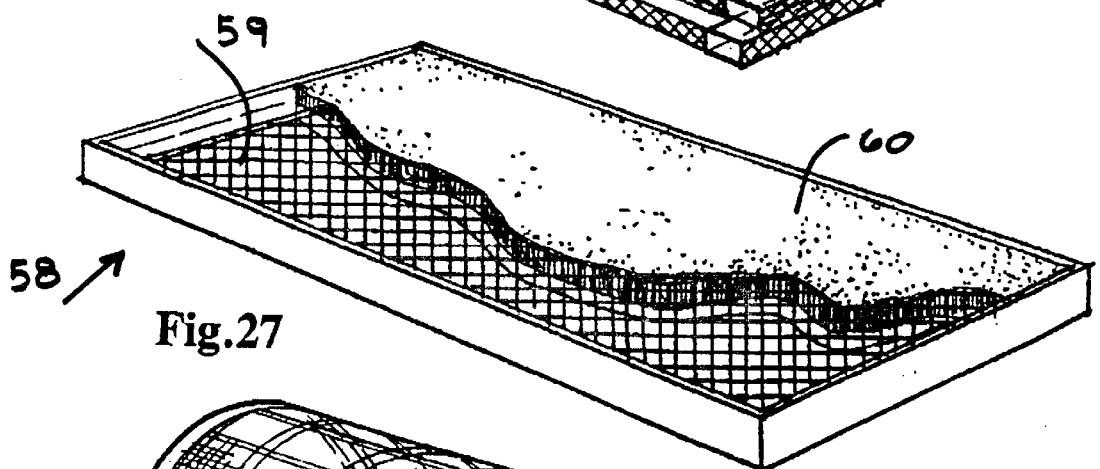
FIG. 27 is a planar mold cavity designed exclusively for security, with a chain link fence section inside a cut-a-way core.
Figure 28:
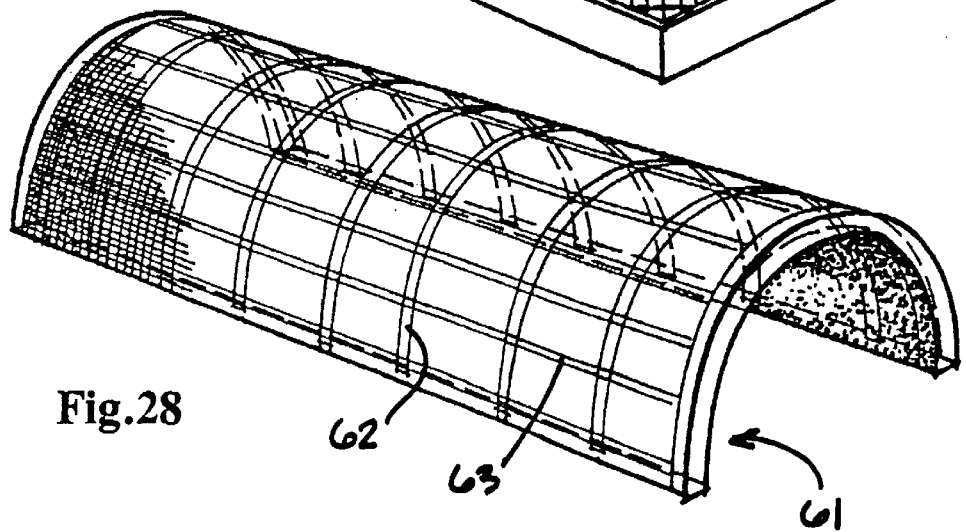
FIG. 28 is a perspective of a barrel-vault shaped form, showing ribbon configurations.
Figure 29:
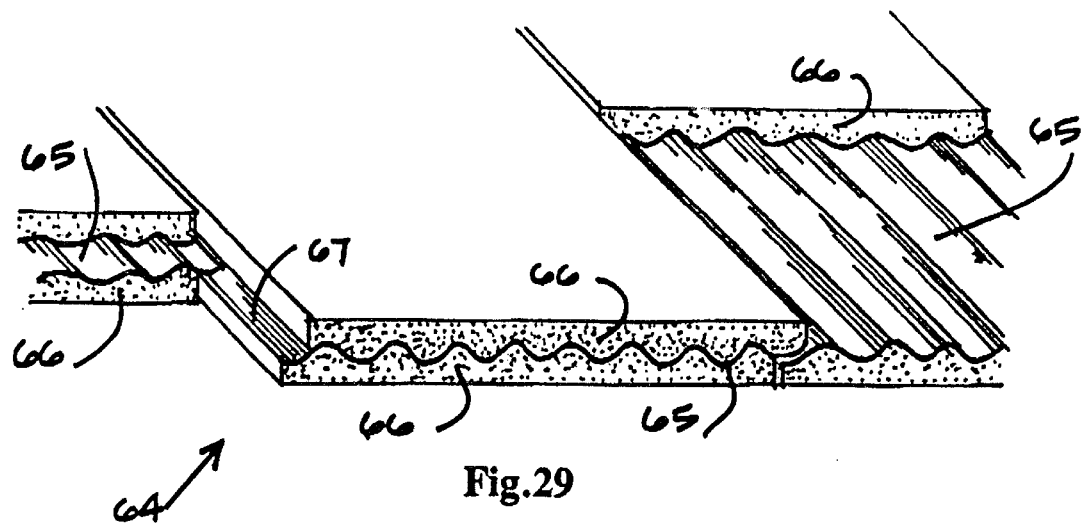
FIG. 29 is an isometric cut-a-way view of a planar panel system with corrugated sheet structure inside, and a shiplap connection system.
Figure 30:
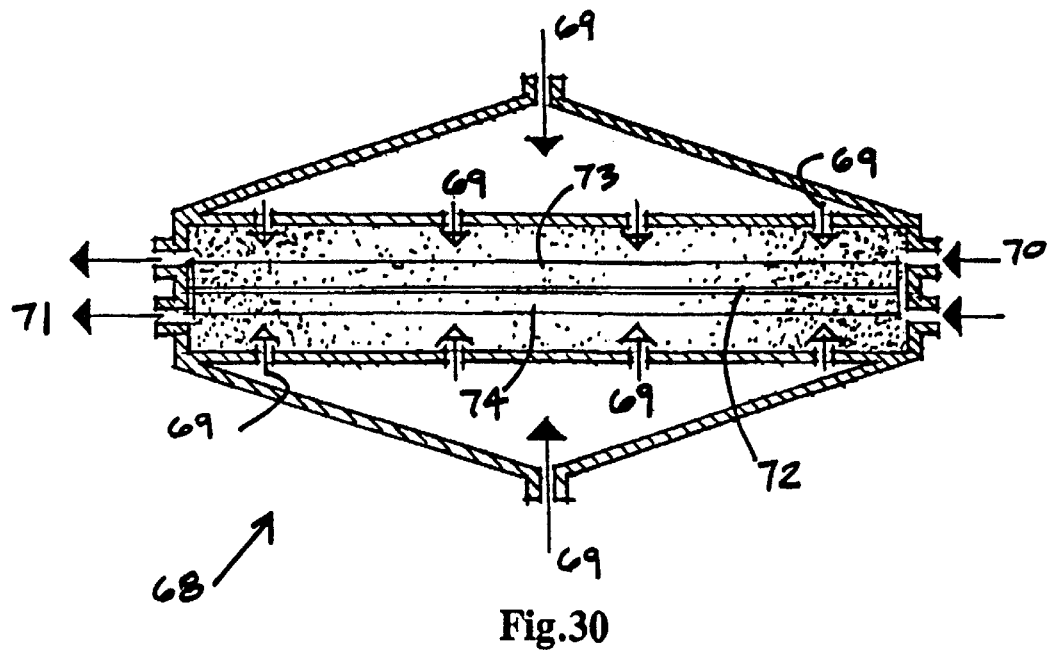
FIG. 30 is a cross-section through a mold of the type conducive to producing the FIG. 29 panel, indicating steam ingress with the vertical arrows, expanded core material in and vacuum out with the right to left arrows.

FIG. 23 is an isometric of axial 33 and transverse 52 ribbons, equally cut and spliced together as shown in planar mold cavity of FIG. 21. FIG. 24 is a longitudinal section of the mold in FIG. 22, showing a configuration of uncut axial ribbons 33 spliced with cut and bent transverse ribbons 30, and 'shoe' supports 53. FIG. 25 is a longitudinal section of FIG. 21, showing a configuration of axial 33 and transverse 52 ribbons, equally cut and spliced together, and 'shoe' supports 53 for the assembly. FIG. 26 is a perspective of a planar structural configuration 54 with shiplap side edges 55, showing a combination assembly of transverse ribbons 56 integrated with woven wire mesh 57. FIG. 27 is a planar mold 58 bottom and sides designed exclusively for security, with a chain link fence section 59 inside a cut-a-way core 60. Basically to show the potential for curvilinear form, FIG. 28 is a barrel-vault shaped form 61 showing the primary load-bearing transverse ribbons 62 and the secondary longitudinal ribbons 63 which are only for form cohesiveness. FIG. 29 is an isometric cut-a-way view of a planar panel system 64 with corrugated sheet structure 65 inside the expanded plastic core material 66, and a shiplap connection system 67. FIG. 30 is a cross-section through a mold 68 of the type conducive to producing the corrugated panel 64, indicating steam ingress 69 with the vertical arrows, expanded core material in 70 and vacuum (or vent) out 71 with the right to left arrows. The reason for the vacuum/vent outlets is to assist in the uniform distribution and densification of polymer all the way down either side of a solid sheet material 72, which in this particular illustration undulates above 73 and below 74 its neutral axis.

As previously described in the Summary section, the standard process of molding expanded polymeric core material is well known and fairly easy to accomplish. Regarding the actual mold casing, the atmospheric requirements within and around it are not difficult to meet. Interior cavity temperatures from 200–250° F. and pressures from 12–15 psi can easily be reached by the introduction of steam into the mold for a few seconds. Externally, normal atmospheric conditions prevail. A polymeric bead material is heated elsewhere, pre-expanded to a closed cell geometry with a void in the center, dried to restrain the cell from premature collapse, and then systematically introduced into the mold cavity under moderate pressure in another few seconds. The beads are reheated, compacted and fused to each other in another 5–10 seconds. Pressurized steam is used as the heating agent, re-heating and filling the interstitial gaps between the beads, to the point where they begin to deform under pressure (as a liquid with a high viscosity) and fuse together. Simultaneously, the adhesive activates, bonding the pressurized beads to the skeleton structure. Then the composite panel is removed from the mold. Complete adhesion is immediate, with moderate curing time required to reach ultimate laminate strength, and the whole process only takes about 20 seconds.

Figure 31:
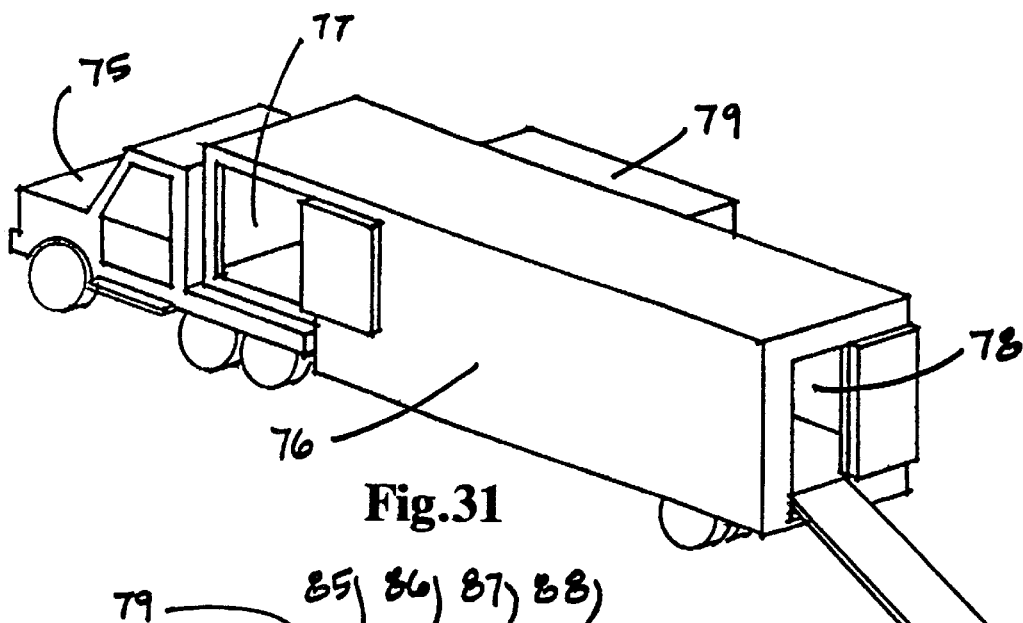
FIG. 31 is a perspective of a tractor-trailer customized as a mobile manufacturing plant, with trailer openings to ingress polymeric material and egress finished composite product.
Figure 32:
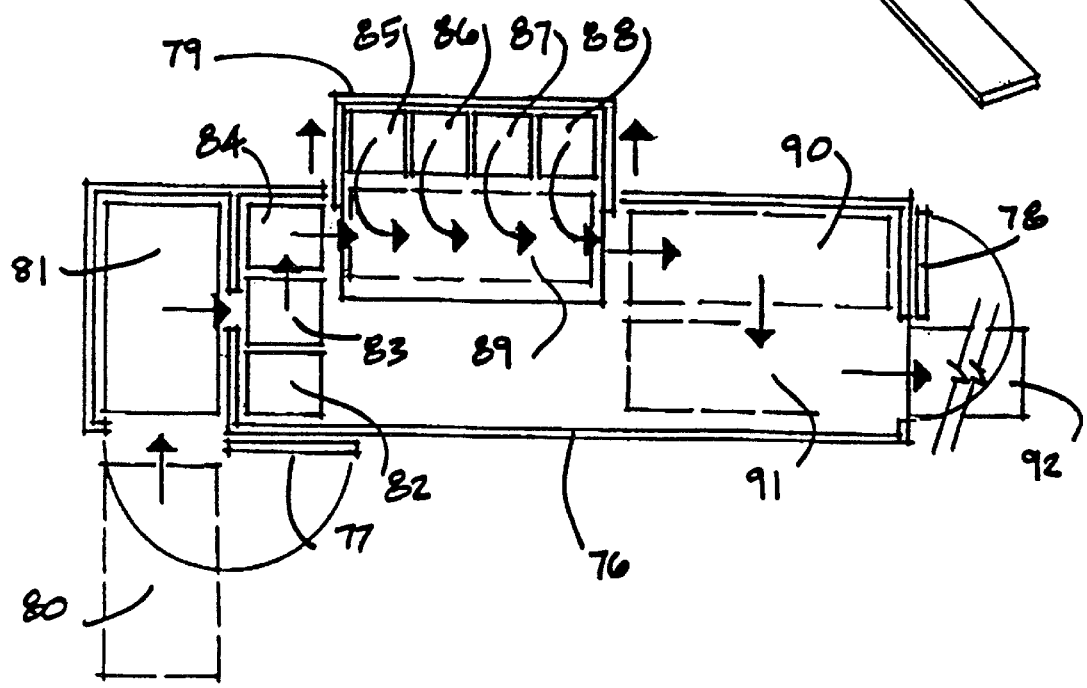
FIG. 32 is a plan view of the 'mobile maker', with all major equipment indicated, with arrows indicating process flow, showing the maker portion integrated into the overall design as a hydraulic slide-out section.

Regarding the method of manufacture, FIG. 31 is a perspective of a tractor 75 and the 'mobile maker' trailer 76 customized as a mobile manufacturing plant, with trailer openings to ingress polymeric material 77 and egress finished composite product 78, and the maker portion 79 as a hydraulic slide-out. FIG. 32 is a plan view of the 'mobile maker' 76, with all major equipment indicated, with arrows indicating process flow, showing the maker portion 79 integrated into the overall design as a hydraulic slide-out section. The process starts by inserting a container 80 of unexpanded polymeric beads, with a vertically movable bottom portion, through a door opening 77 in the side of the trailer 76, and situating it on a spring loaded platform for bead storage 81. As the container of beads overflows in the direction of the flow arrow into a pre-expander 83, the spring loaded platform continues to raise the bottom part and force the continual overflowing of beads according to its resistance to weight. A stand-by gas operated generator 82 is available in the event no line electrical power is present on site, or at least, for immediate operation to be able to begin prior to such a hookup.

As the beads heat up to in excess of 200° F., they begin to expand to 27–40 times original volume and create a bubble effect, or create a void inside each separate expanded bead. From the pre-expander, they in turn overflow into a dryer 84 which provides each bubble with a permanent encapsulated shape and guards against the premature collapse of the bubbles. Upon bead stabilization, as needed, the expanded beads will be introduced into the cavity of a mold form, indicated here as a flat surface maker table 89 "press" shape, suitable for the standard production of 4'×12' panels, or lesser increments as desired. Adjacent to the maker table 89, are located the source of structural material 85 to be introduced into the cavity of the mold, a source for pressure 86 to the introduction of beads, steam 87 to heat, further expand, compact and fuse the beads in the mold cavity, and a source for vacuum 88 located at the end of the cavity as an assistant to the introduction and compaction of beads. Once the production process on the maker table 89 is finished, the panel is then temporarily stored in area 90 before being placed outside the body of the trailer, usually on a construction site. From there, the panels are removed manually to the floor area 91, under which a ramp 92 can be stored in a enclosed pocket during transport. In fact, the upper surfaces of the floor 91 and ramp 92 may be fitted with rollers such that the finished panels are rolled out the egress door 78 onto the site of actual construction, or to a storage facility related thereto. Parenthetically, the hydraulic slide-out 79, is withdrawn into the body of the trailer during transport, and the bead storage containers 80 are periodically replaced as needed. Thus, the entire manufacturing plant can be mobilized in a compact, systematic and orderly process and, just like concrete trucks, trailers such as these can be manufactured in the thousands for the preferred option to bring compact, unexpanded raw materials to a construction site, for expansion and assembly, on demand.

Figure 35:
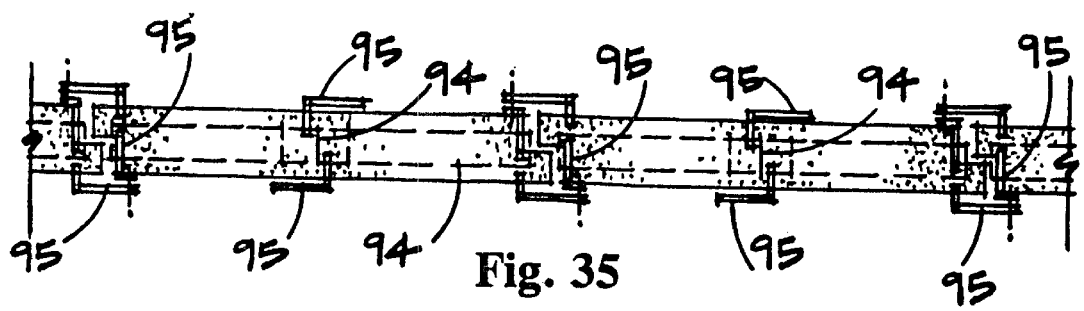
FIG. 35 is a cross-section of interconnected panels, comprised of continuous ribbon, L-shaped external laminations, and shiplap edge connections.
Figures 33, 34:
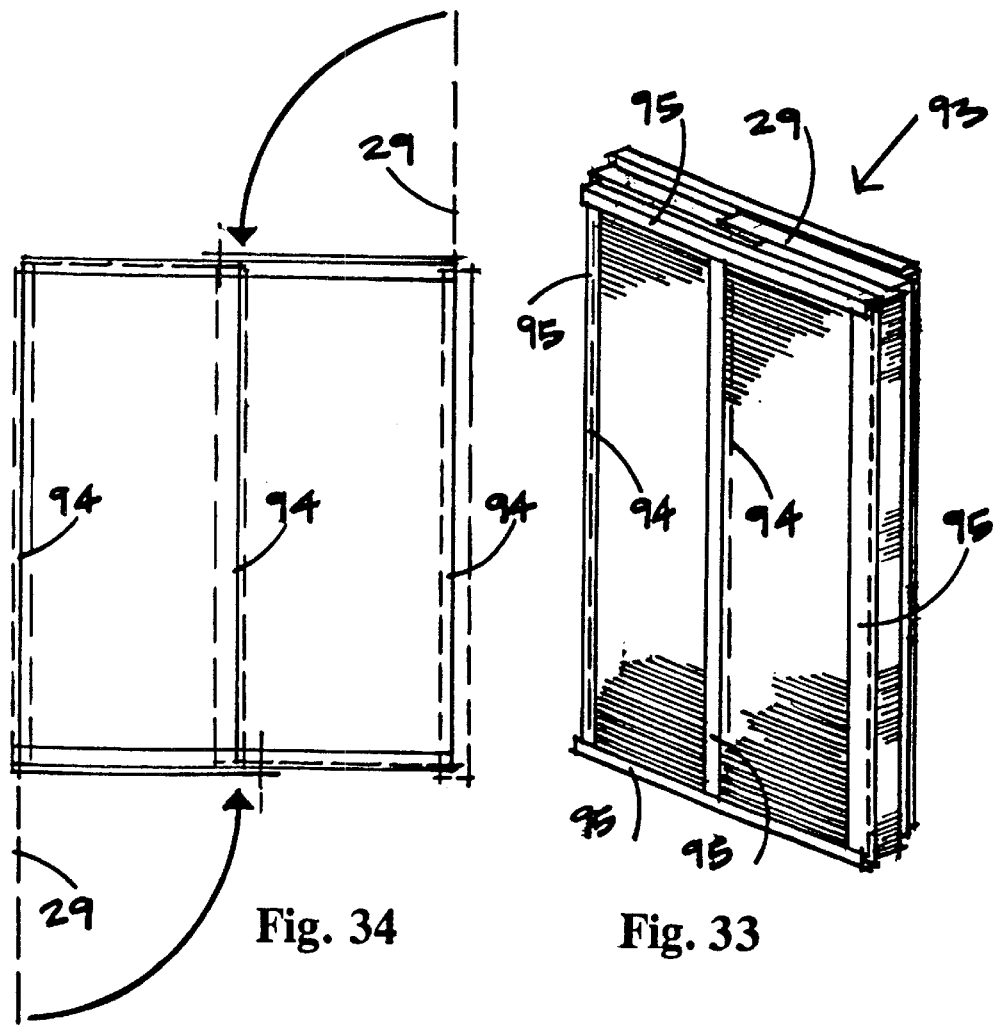
FIG. 33 is a perspective of a planar panel using a system similar to that of FIG. 9, in combination with a series of universal L-shaped rigid members laminated to the surface of the composite, in optional combination with an encapsulated ribbon skeleton structure, with shiplap panel edges which facilitate an effective interlocking system between panels.
FIG. 34 is a diagrammatic elevation of FIG. 33, showing the continuous ribbon pattern.

Following panel manufacture is building assembly. In anticipation, a system of interconnection need be devised to interlock adjacent prefabricated units. A most simple and convenient method of interlock is the 'shiplap' joint which greatly increases the butt end contact area and, at the same time, restricts the possibility for infiltration of the outside atmosphere into the building enclosure. FIG. 33 is a perspective of a planar panel 93 with a skeleton ribbon structure 94 which is encapsulated just inside each vertical side edge and the panel center as shown, with an extension 29 folded back and fastened onto exposed end panel ribbon returns, with universal L-shaped external laminations 95 which effectively create lateral bracing as well as continuous surfaces for attaching finished siding materials, and complete perimeter surround for composite dimensional control after cooling, and for joining adjacent panels together. FIG. 34 is a diagrammatic elevation showing the continuous ribbon pattern 94, and FIG. 35 is a cross-section of interconnected panels 93, comprised of continuous ribbon 94, L-shaped external laminations 95, and shiplap edge connections as previously described.

Figure 36:
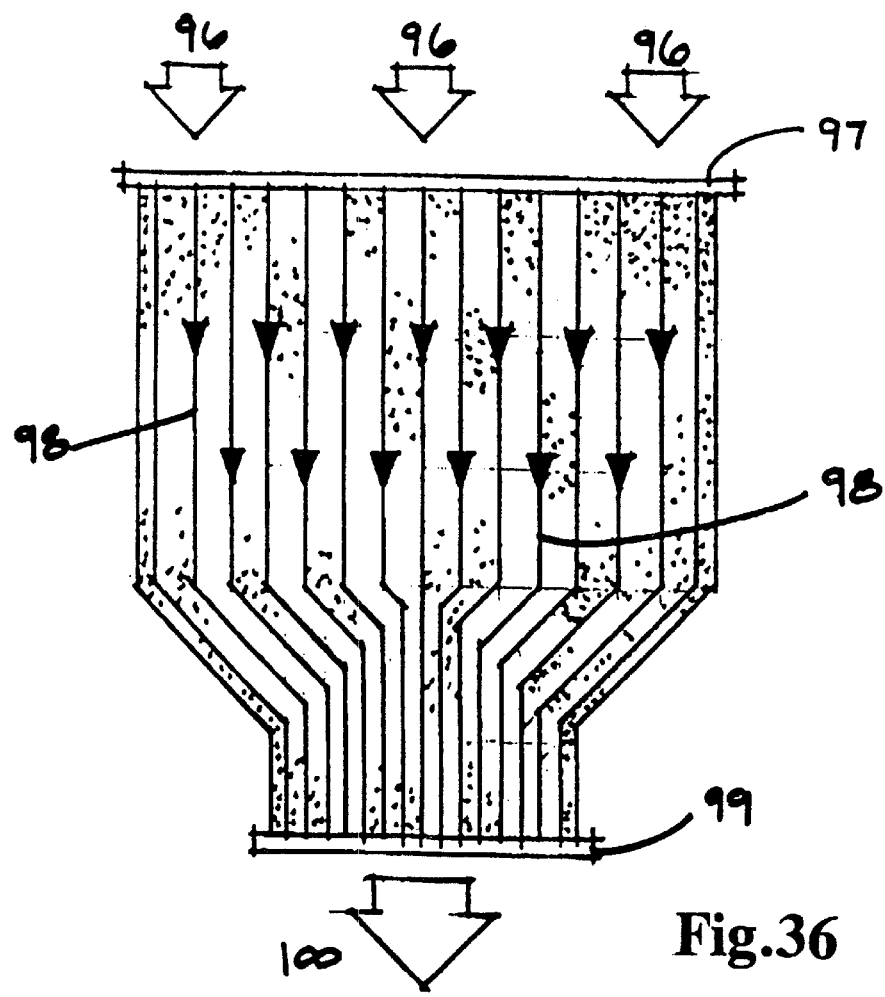
FIG. 36 is an illustration of the fundamental stages of structural design: receive, transfer, channel, collect and support extraneous forces through the composite material.
Figure 37:
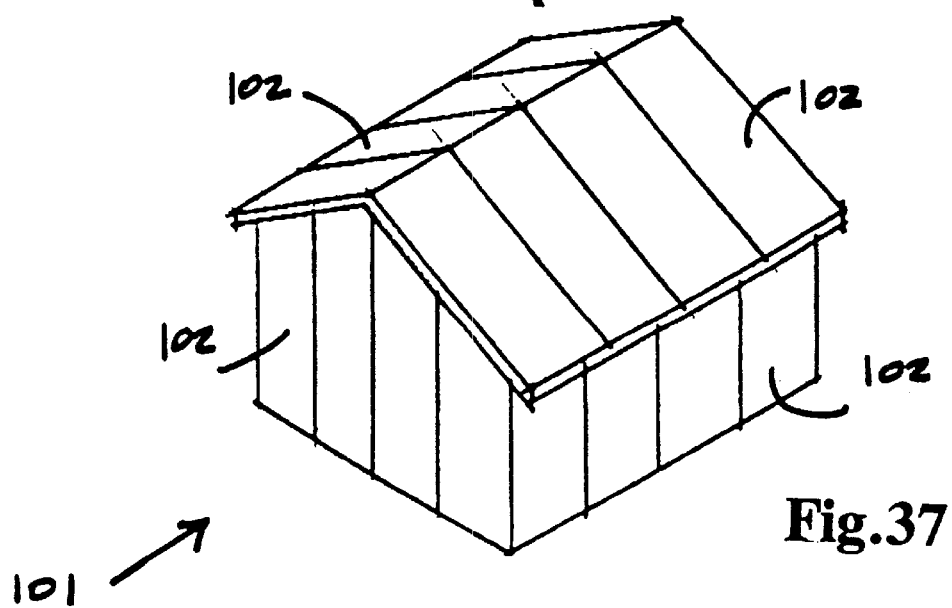
FIG. 37 is a simple house assembly, showing the application of prefabricated composite panels of the present invention throughout.

FIG. 36 is an illustration of the fundamental stages of structural design: receive loads 96, connector plate for transfer of forces 97, channel lines of force 98, connector plate for collection 99, and ultimately support 100 extraneous forces through the composite material. The significance of this diagram is to emphasize the importance of tracing all imposed loads through the composite assembly, entirely by means of the direct tactile contact of the encapsulated structural members. Design and detailing must deal with the fact that no loads are carried, either directly or indirectly, by the expanded polymeric material. FIG. 37 is a simple house assembly 101, showing the application of prefabricated composite panels 102 of the present invention throughout, including the walls and roof as shown, and the floor panels (not shown) as well.

Figure 41:
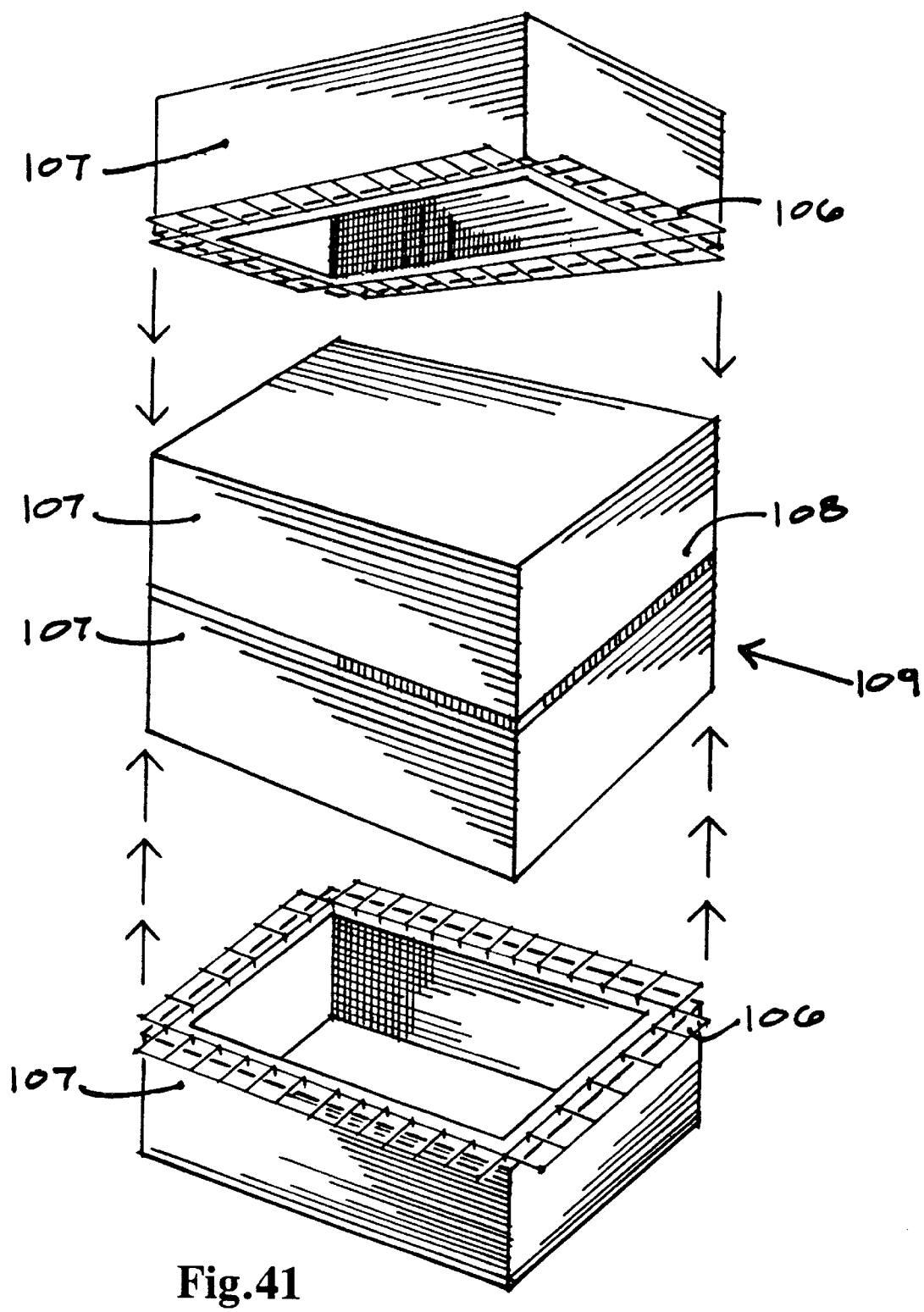
FIG. 41 is a perspective of a three-dimensional module assembly process herein before described in FIGS. 38–40.

It was mentioned earlier, the importance of three-dimensional molding. Of highest significance, is the realization that the weight and the pliability of this plasticized structure facilitate the premier of large scale three-dimensional module potential, merely because lifting devices and resistance to cracking, are probably the two most paramount conditions to be satisfied in a feasible solution to this technology. Lifting is solved because this composite weighs almost nothing, and expanded plastic foam has the pliability to absorb the racking stresses which are to be expected in the lifting and assembly of such large building components as these. It is unbelievable. In that it is strong, and it is not brittle. It stretches. FIG. 38 is an exploded view of a three-dimensional mold system 103, comprised of a female part 104 and a male part 105, including a skeleton structure "french-fry basket" insert 106. These three components are meant to be integrated into the establishment of a sealed three-dimensional mold cavity, as shown in FIG. 39, which shows the skeleton structure 106 suspended within the approximate center of the core material 107 located within as well as extending somewhat outside the mold casing, for purposes of interconnection with similar modules. FIG. 40 indicates the significance of the extremities of the skeleton basket structure 106, in that they are intended to be interlocked, and sealed in a synthetic mastic joint 108. In fact, this basic form can be considered one-half of a total room-sized unit, by mating two of these units, as shown in FIG. 41, where the completed structural unit 109 can be duplicated and turned upside down and mated together with a joint system matrix 108, ultimately forming a completed three-dimensional module that is a structurally integrated unity, and thereby available for custom cutouts and special fabrication to meet particular needs.

Up to this point, the fundamental concepts of the present invention have been more or less related to the basic molding technology of expanded polystyrene foam, including the benefits of heat, pressure and the constriction of a mold. But the key to the technology of this invention in not molding, it is composite lamination. Therefore, the additional manifestations to follow here go beyond simple molding techniques.

Figure 42:
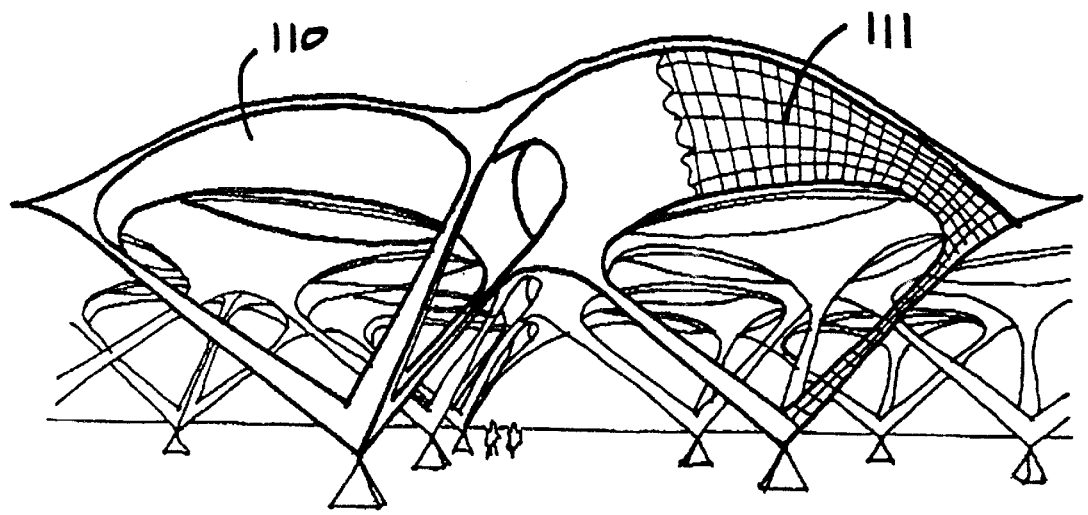
FIG. 42 is a perspective of a free-form surface structure, a portion of which is left unfinished to reveal its skeleton structure of woven wire mesh gridwork configurations.
Figure 43:
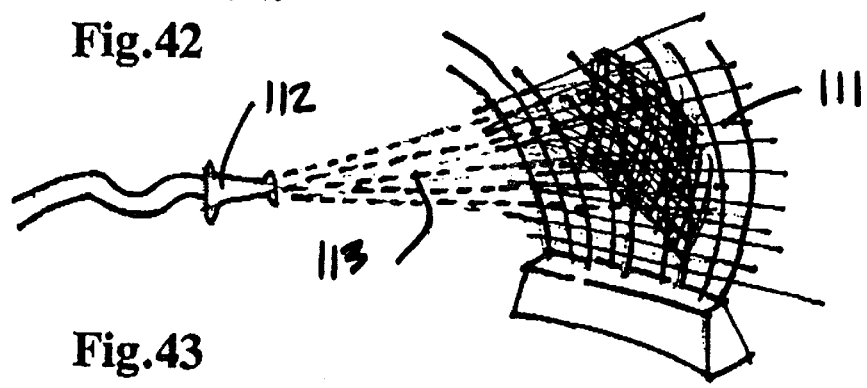
FIG. 43 is an illustration of a hose spraying polymeric material onto the mesh gridwork.
Figure 44:
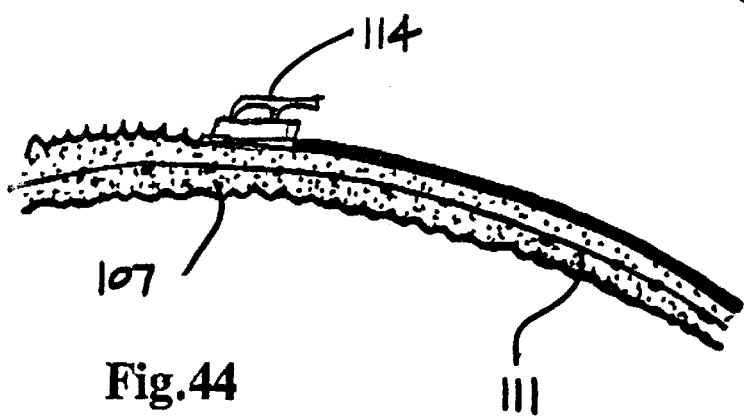
FIG. 44 is an illustration showing an 'iron-like' hot trowel device providing a smooth finish surface on the sprayed material which has totally encapsulated the mesh gridwork.

FIG. 42 is a perspective of a free-form surface structure 110, a portion of which is left unfinished 111, to reveal its skeleton structure of woven wire mesh gridwork configurations. The suggestion as in FIG. 43 is that, with this technology of encapsulated structure, there exists the potential to accomplish permanent free-form structural configurations, without the benefit of steam, pressure and the constriction of a mold, by introducing air-borne prime coated bead material in the direction of a prime coated and pre-heated woven wire matrix, which would "catch" the spray, encapsulate the structure, bond the bead, and thereby make this a legitimate structural entity. The individual beads themselves may also become prime coated in mid-flight by an aerated mastic mist emanating circumferentially from the same nozzle 112 used for bead spraying polymeric material 113 onto the mesh gridwork 111. Another technique is a two-part epoxy system with one to the bead and the other to the structure. Heat activated adhesive systems are another option, by heating the wire gridlock with microwaves. FIG. 44 is an illustration showing an "iron-like" hot trowel device 114 providing a smooth finish surface on the sprayed material, which has totally encapsulated the mesh gridlock 111 inside the core material 107. Additionally, using the same technology as originally described here in FIGS. 2 and 3, the free-form wire mesh gridlock may be either magnetized or prime coated to generate adherence for an initial application of structural debris, prior to bead spraying, in order to encapsulate extra reinforcement for lateral bracing.

The technology of encapsulated structure offers a whole new realm of possibilities, not only for the building designer but also for the manufacturer and the contractor. Pursuant to this, FIGS. 45–48 suggest a compact method of component prefabrication wherein a plurality of thin gage sheet structural material is specially folded and compressed prior to molding. This technology is for the composite manufacturer, and is especially suitable for use in the "mobile maker" as previously described herein in FIGS. 31 and 32. The application here is to develop "accordion-type" pre-collapsed structural configurations, for economy of storage in portable manufacturing conditions, which can be manually expanded for ease of assembly just before insertion into the cavity of the mold. FIG. 45, then, is a plan view of one variation of the flat pre-folded "accordion-type" structural insert 115. FIGS. 46–48 show progressive stages of expansion of the "accordion-type" structural insert 115 to near fully extended position in FIG. 48 shown here inside the dashed-line columnar mold form 116. FIG. 49 is a perspective of a completed composite 117 with one pattern of expanded structural inserts 118 set in the molding form. This technology is already being used in areas of remote access, such as for the assembly of unique structures for underwater or space exploration, where the initial storage for delivery is critically limited. Therefore, in keeping with the extremely densified size of the unexpanded bead, as 27 times smaller than the finish size, it certainly has a logical relationship to the portable manufacturing process heretofore described. It also makes sense to develop this technology for the actual manufacture of space stations in the near future.

For the general contractor, another major application of the new technology is seen in FIGS. 50–52, which describe a method of erecting a high-rise building out of this synergistic material which, in many ways, never before had a chance a being feasible. FIG. 50 is a plan view of a "space" frame structure 119 with collars 120 interlocking four major columns 121 spaced 50' apart, for example. The use of the word "space" here does not imply the interplanetary use, but merely the conventional term for a lightweight structural assembly of stick-like components. Here such as assembly could be prefabricated and encapsulated into component pieces, then joined together without heavy equipment to form a structure capable of carrying great loads. In fact, this assembly will become the top of a high-rise building, and will be structurally engineered to support a number of building floors below it.

FIG. 51 is a perspective of the space frame structure 119 with collars 120 interlocking the four major columns 121, showing hoisting mechanisms 122 on each collar and a movable crane boom 123 attached to the top of the space frame, in the center. Now, because everything is so lightweight, it has become feasible to easily assemble this frame, which for example is nine feet deep, and insert say two-story long column sections through the collars on the corners of the frame. Next, preferably below grade, devise a method to secure these columns to individual foundation blocks and, by hoisting mechanisms 122, raise the entire space frame assembly 119 until the top of the corner collars 120 is near the top of the column sections 121. This, in effect, has elevated the frame off the ground and created a building structure. The movable crane boom 123 can hoist up new column sections to be joined, perhaps by a male to female connection system, to those already in-place. Then, in turn, using the hoisting mechanisms 122 again raise the entire space frame assembly another two floors. This, in effect, has elevated the frame four stories off the ground and created a self-erecting building structure. For lateral bracing of the four column assemblage, perhaps temporary cable cross-bracing (not shown) between combinations of two to four columns could offer stability until the final floors are all in-place. However, because of the techniques of molding in the present invention, especially with regard to the portable potential, it is conceivable that the individual corner "collars" 120 themselves could each become elongated and have the multifunctional capability to mold the column sections en route. The reason this is quite feasible is that the actual mold casing, as described in the Summary section herein, is not a heat source and hence doesn't require sophistication. The heat and pressure are generated by steam, and the steam as well as the polymeric beads are distributed conventionally by hoses, which in this embodiment could simply be lengthened as the building structure grows. So, the only material to be hoisted would be the elongate structural members.

Once the space frame has reached its final elevation and the overall structure is stabilized, prefabricated three-dimensional boxes, similar to that previously described herein in FIG. 41, could be moved into position directly beneath the space frame and, for example, stacked in multiples of four superimposed on each other by a fork-lift. FIG. 52 is a partial section cut through eight levels of such three-dimensional modules 109 as shown previously in FIG. 41, which are suspended in four-floor sections immediately below the space frame (not shown). Note that the logic to the four floor stacks of modules takes full advantage of the individual bearing capacity of the unit module's wall strength as indicated by arrows 124 to carry more weight indicated by individual arrows 125 than itself. This is normally the case with conventional walls, as the governing factor in wall structure is usually lateral stability rather than simple bearing. Therefore, less supporting cables are required, which correspondingly means less penetrations through the respective units superimposed above each other, or less requirement for chase space for such structure. Hence, tension cable 126 penetrates through embedded conduits in all eight levels shown here, cable 127 penetrates through embedded conduits in only the top four and, in an overall high-rise building, the lowest four floor levels could have no tension support whatsoever and be supported on the foundation structure.

Figure 54:
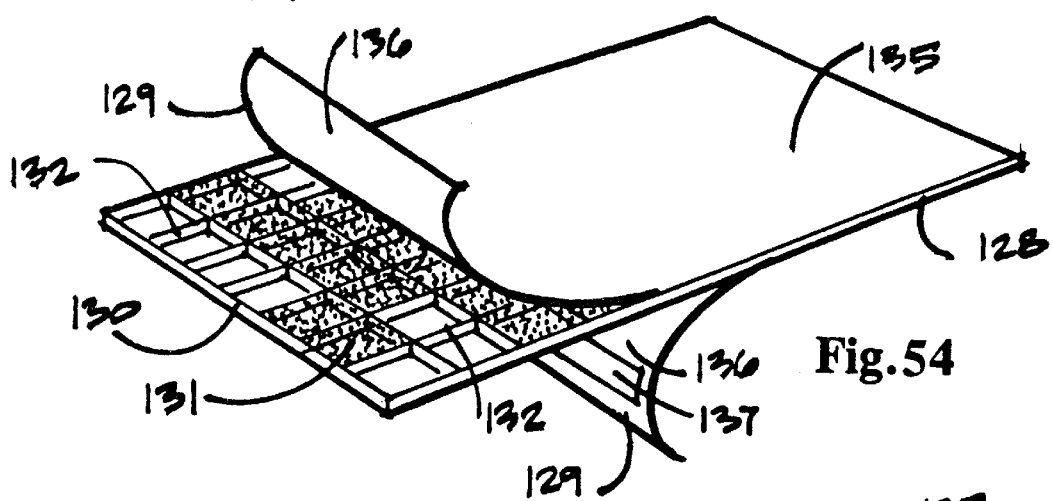
FIG. 54 is a perspective of flat sheet foam core material, showing the outer membranes peeled back to reveal the foam, a reinforcing membrane underlayment strip, and an optional encapsulated grid-like core structure.
Figure 53:
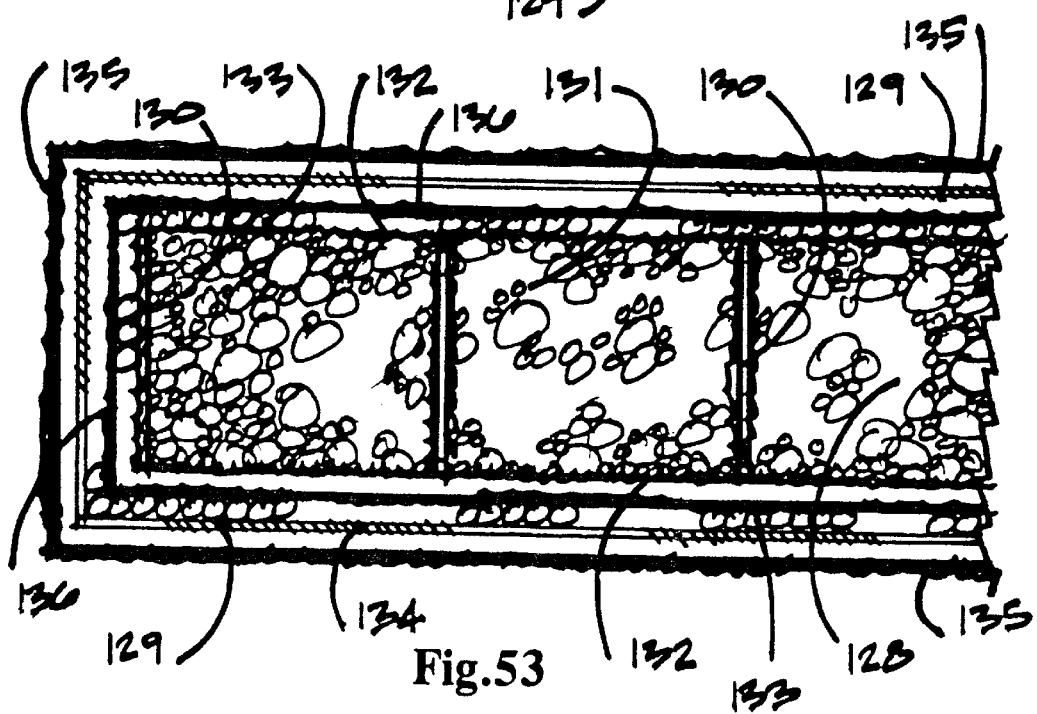
FIG. 53 is a partial section cut through an edge of flat sheet of foam core material, showing the fire protective laminated membranes and an optional encapsulated structure.

For fire protection, all of the preceding applications illustrated here require an effective separation from the inside of a building by an approved thermal barrier such that the unexposed surface of said barrier does not exceed 250° F. for a minimum of 15 minutes in accordance with the requirements of ASTM E119. FIG. 53 is a partial section through an edge of flat sheet foam core material 128, showing the fire protective resilient membrane wall covering 129 and an optional encapsulated honeycomb or grid-liked structure 130, and FIG. 54 is a perspective of the same flat sheet foam core material 128, showing the outer membranes 129 peeled back to reveal the actual foam 131, a reinforcing membrane underlayment strip 137, and an optional encapsulated grid-like core structure 130. A resilient membrane wall covering 129, such as for example a phenolic resin paper, an unfinished fiberglass cloth, or a reinforced pulp paper is bonded to the surface of the polymer core by an adhesive 132 which is activated during molding. But system characteristics of the adhesive not only laminate the membrane 129 to the core 128, they also take full chemical advantage of the optimum molding heat to form the strongest possible crystalline structural matrix 133 on the bead surface. This encapsulates the peripheral cellular structure, contributes insulative value to the core and retards the delamination of the composite. Furthermore, the membrane 129 may be impregnated with high temperature flame and chemical resistant fibers 134 to assist the fire protection as fireblocking underlayments to increase the ignition resistance of the foam core material.

Figure 55:
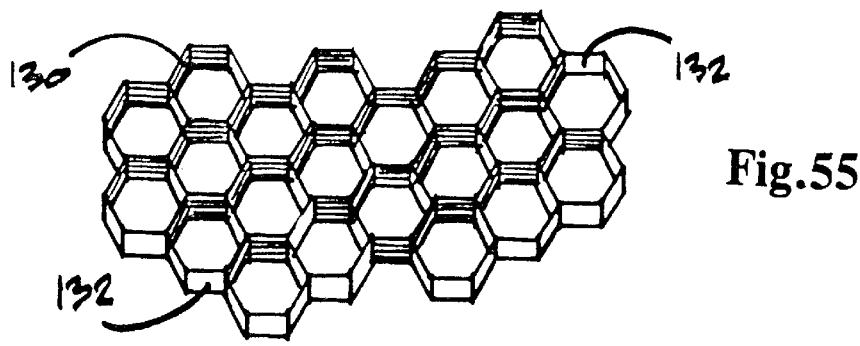
FIG. 55 is a diagrammatic detail of an optional three-dimensional honeycomb grid insert.

As a final treatment of the membrane 129, in addition to the heat-activated adhesive 132 on the inside, the selection itself of a particular material fiber, fabric or paper, and the possible impregnation of that material with an ignition resistant chemical 134, a thin-film intumescent coating system offers a final frontier of fire protection on the outside 135 of the membrane and, optionally, also on the inside 136. When exposed to flames or high heat, it has the capability to expand up to one hundred times its dry film thickness, insulate and protect the membrane by limiting the recognition temperature to 200° F., safely below the melt point of the bead. On the inside, the same heat that causes the beads 131 to shrink now causes the intumescent 136 to simultaneously expand. In effect, this neutralizes the creation of voids beneath the membrane with a constrained, insulative material under pressure. In turn, this tends stabilize the shape of the composite 128 and retard the delamination of the structure. FIG. 55 is a diagrammatic detail of an optional three-dimensional honeycomb grid insert 130 which may also be geometrically shaped as indicated in the preceding illustration. If used, it would be prime coated with the heat-activated adhesive 132. Also, the honeycomb or grid material and its fabrication would utilize techniques already available in the industry, especially as already learned in the construction of hollow core door manufacturing. Further, in the molding process bead inlets would necessarily be located in every cell of the grid, and would penetrate that particular side of the board meant to be unexposed, or at least secondary to the other side in terms of appearance. The expense of the grid fabrication and the large number of individual bead inlets required would be offset by the anticipated demands of mass-production.

Figure 56:
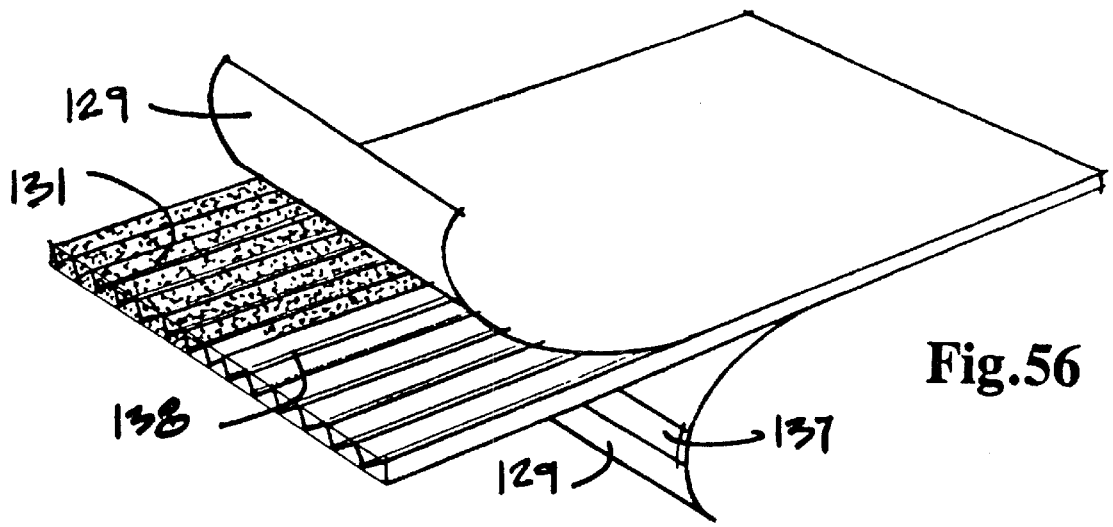
FIG. 56, similar to FIG. 54, is a perspective of flat sheet foam core material wherein the encapsulated core structure is a continuous corrugated sheet

FIG. 56 is similar to FIG. 54 with outer membranes 129, underlayment strip 137 and inner polymeric foam material 131, except the encapsulated core structure is a continuous corrugated sheet 138, thermoformed to composite specifications for desired homogeneous characteristics and scientifically predictable results.

Figure 57A:
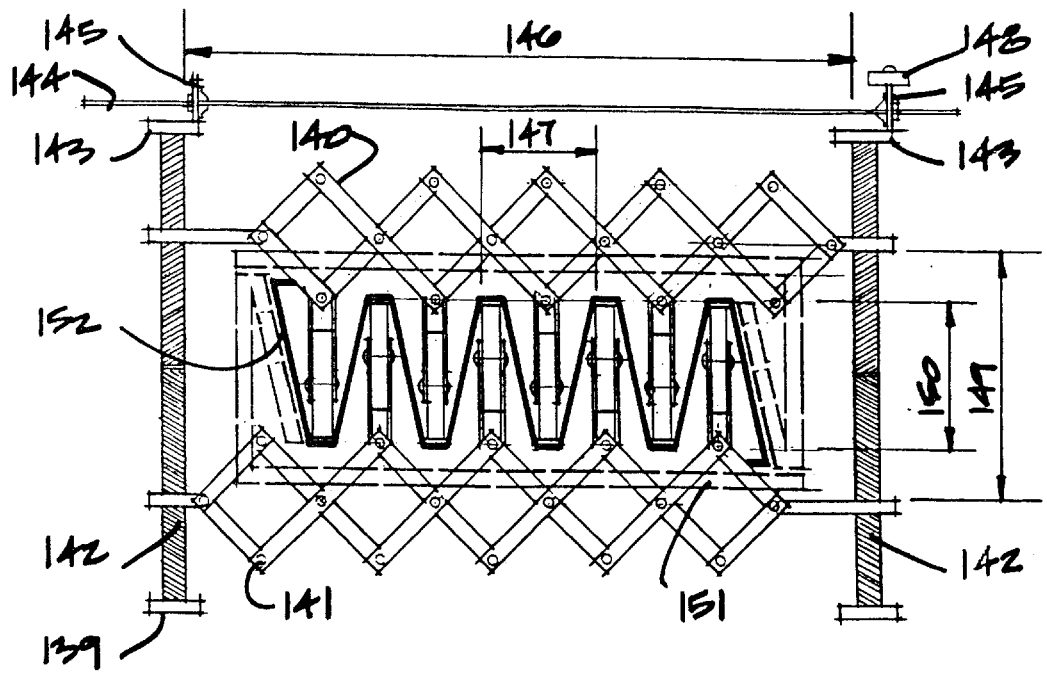
FIG. 57a is an adjustable thermoform assembly-line device, capable of horizontal and vertical displacement of two roller groups, with an in-line mold casing superimposed.

FIG. 57*a* is an adjustable thermoform assembly-line device 139, capable of horizontal and vertical displacement of two roller groups, an upper 140 and lower 141, which are attached to scissor carriages which span the assembly line and connect with converging pitch threaded rods 142. On top of each threaded rod is a fixed disk with an upturned swivel lever 143 through which a horizontal shaft 144 is passed. The shaft is attached to each lever by an adjustable fastener 145 and controls overall rod spacing 146, down to incremental roller spacing 147 which is equivalent to the rib spacing dimension of the corrugated sheet profile. Conversely, a hand-held revolving wheel grip 148 attached to one of the upturned swivel levers can be manually rotated to vertically converge or expand the roller units an overall distance 149 which ultimately effects the amplitude 150 of the desired corrugated sheet form. This technique thus allows adjustment to the density of rigid material in a given lineal product width as well as the section modulus in the transverse direction. An in-line mold casing 151 is diagrammatically superimposed around the actual roll form 152.

Figure 57B:
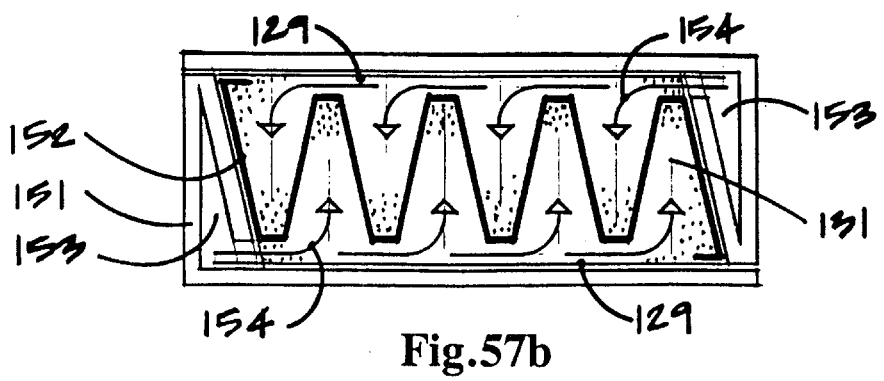

FIG. 57*b* is a cross-section of the in-line mold casing 151, sized to receive the corrugated sheet 152 of the thermoform device of FIG. 57*a*. Note that the inner sidewall geometry of the mold cavity creates a continuous steam manifold 153 for the distribution of steam as indicated by arrows 154, which is directed to heat and fuse the polymeric foam material 131 into each respective corrugated linear cell. Outer membranes 129 are shown in position just below the top and bottom of the mold casing structure, for heat activated adherence during this same steam process.

Figure 58D:
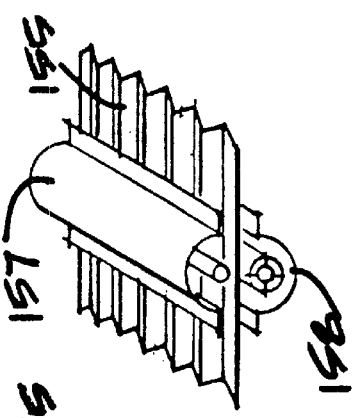
Figure 58C:
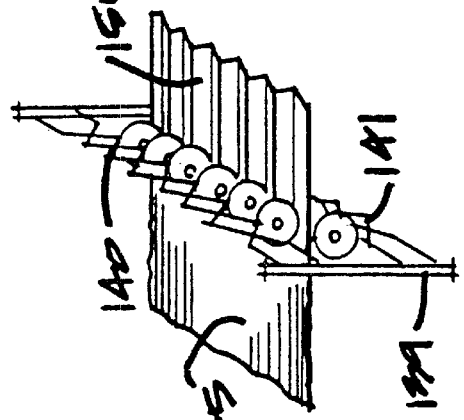
Figure 58B:
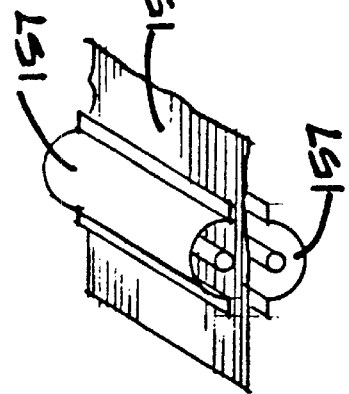
Figure 58A:
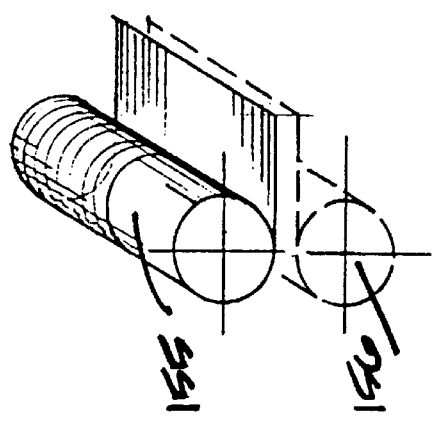

FIGS. 58*a*–58*j* are sequentially grouped together to illustrate the entire assembly-line process of thermoforming semi-rigid material, preparation, encapsulation, lamination and molding, shown graphically in a disconnected series of stages. Suitable equipment will reduce the melt temperature for safe handling, set sheet dimensions, help control the surface finish, provide support, and match or balance the assembly line rate. Other factors to consider are the melt temperature differential between rigid and resilient material, which can be affected by increasing the cavity pressure and density to compensate for lower heat distortion, and the degree of unilateral polymer orientation which is a by-product of the process temperatures. FIG. 58*a* is roll storage of a semi-rigid sheet material 155, with an optional roll 156 indicated below in multiple laminate applications. This sheet material is selected on the basis of its ultimate thermoformed strength characteristics as well as its heat tolerance inside the cavity during molding. FIG. 58*b* indicates infra-red heaters 157 above and below the sheet material to achieve a glass transition temperature to soften the polymer matrix in preparation for forming. For example, polystyrene sheets require about 100° C. to enter a "glass transition" state, and dimensional stability is a function of the forming temperature, cooling rate and section thickness of the sheet, but the structural properties retained are about 7–9000 psi tension and 15–20,000 psi compression. FIG. 58*c* is the adjustable roll-form device 139 as heretofore shown in FIG. 57*a*, with the upper 140 and lower 141 adjustable roller units, through which the softened material is being thermoformed. This is followed immediately in FIG. 58*d* by a multi-zone for the simultaneous annealing or heat strengthening, which allows fabricated parts to maintain performance properties and dimensional tolerances at higher temperatures than inherently normal, and cooling of the formed product to stabilize its geometric shape, with infra-red heaters 157 above and squirrel cage fan blowers 158 for simultaneous cooling below. FIG. 58*e* is a prime coating zone, wherein a variety of adhesives or heat resistant chemicals may be applied by spray painters 159 onto the upper and lower thermoformed surfaces of the now totally rigid material 155. FIG. 58*f* is a laminate integration zone, showing the respective top 160 and bottom 161 sheet storage rolls, with prime coating zone upper and lower spray painters 159 applying adhesives, heat resistant chemicals or intumescent coatings 135 or 136 as heretofore described in FIG. 53, on line to guiding rubber draw rollers 162 which position the outer composite skin membranes with the formed product 155 in-between.

Figure 58J:
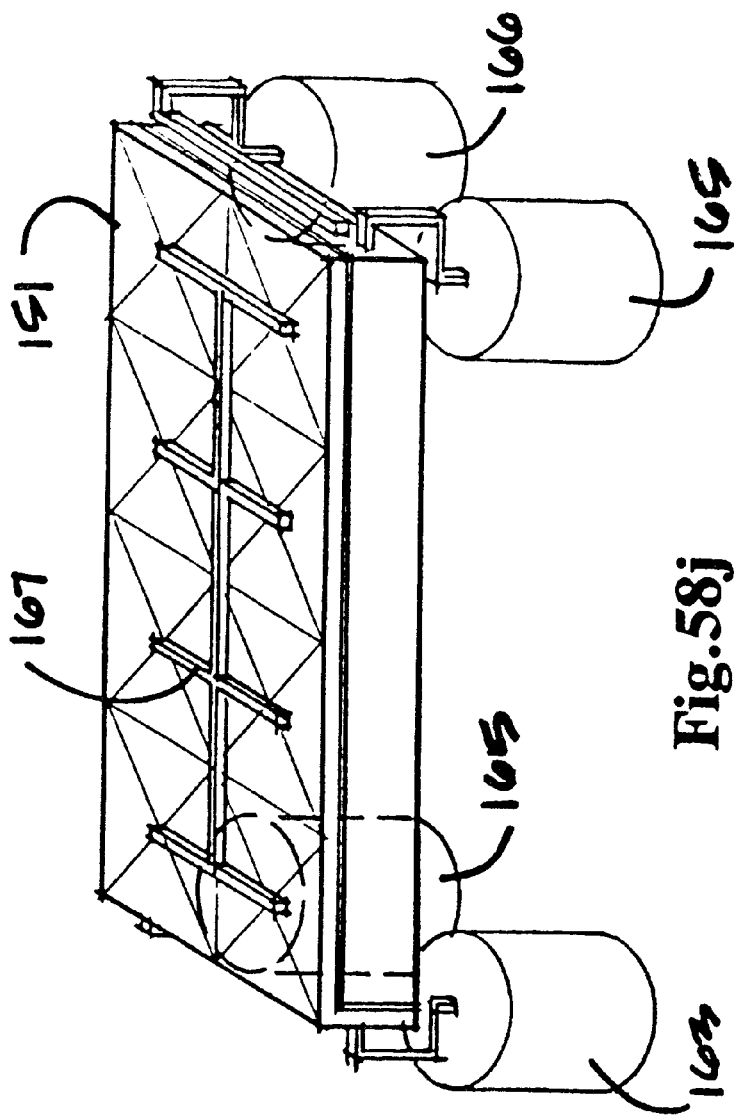
Figure 58H:
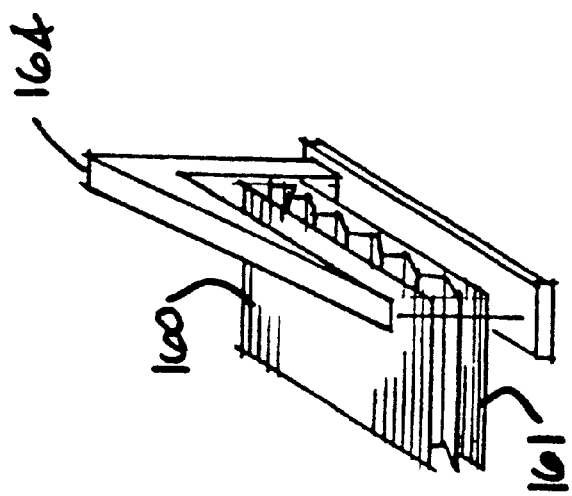

FIG. 58*g* is alternate to FIG. 58*f* where, in lieu of molding, the top 160 and bottom 161 sheets are laminated directly to the corrugated crests and troughs of the thermoformed sheet 155, wherein polymeric foam beads 163 is injected through infra-red heater zones 157 and synchronistically introduced directly into each and every corrugated cell just prior to being compressed into foam core material 131 by the laminating rollers 162. The significance of this product is that it combines total laminate strength with a continuous technique of introducing polymeric material under conditions of heat, pressure and the constriction of a mold which, in this case, is the linear corrugated cell formation. FIG. 58h is a shear device 164 either for cutting separate sheets prior to molding as per FIG. 58f, or cutting finished composite sections formed up-line in FIG. 58g. FIG. 58j is an exterior perspective of a mold casing 151 similar to that shown in the cross-section of FIG. 57b, with associated feed source tanks for polymeric material 163, steam 165 associated with said inner manifold distribution inlets, and optional vacuum 166 to assist the polymeric inlet draw effect. Additional steam inlet casing 167 on top of the mold cavity is another optional means of introducing steam in flat product shapes for uniformity and strength in density and compaction prior to the lamination of surface membranes.

FIGS. 59a–59e are grouped together to illustrate a panel interconnection system for the thermoform 152 of FIG. 57 encapsulated by the polymeric foam material 131, with the surface laminations 129, requiring mechanical fasteners 168 between composite sections. FIG. 59a is a left jamb channel frame 169. FIG. 59b is a complete panel interlocked between other panels. FIG. 59c is a right jamb channel frame member 169. FIG. 59d is the butt-end channels 169 interlock of two unmating panels. FIG. 59e is a corner post 170 utilizing the typical channel 169 interlock system. FIGS. 60a–60e are grouped together to illustrate a panel interconnection system for an optional thermoform shape 171, encapsulated by the polymeric foam material 131 with the surface laminations 129, and an optional channel frame member 172. However, these panels interconnect as a self interlocking 'hook and notch' system, requiring no mechanical fastening between composite sections. FIG. 60a is a left jamb channel frame 172. FIG. 60b is a complete panel interlocked between other panels. FIG. 60c is a right jamb channel frame 172. FIG. 60d is the butt-end channels 172 interlock of two unmating panels, with spacers 173. FIG. 60e is a corner post channel 172 interlock, with spacers 174.

In conclusion, the present invention as described above deals with the development of a laminated composite building component, capable of sustained axial stress as a primary support structure and enclosure of a building structure, comprising a lamination of rigid and resilient material, said rigid material formed of sheets with continuous corrugations parallel to the supporting axis and which have opposite faces being bonded to and encapsulated by said resilient material, said resilient material being a cellular foam matrix, an adhesive or fusion that bonds the rigid and resilient material together in either a static or continuous laminating process, said resilient material forming two outer surfaces spaced from the rigid material, said rigid material having opposite lateral edges being exposed from said resilient material, said lateral edges of the rigid material having return flanges for interlocking said laminated composite building component with adjacent building component, and said building components capable of being supplied and distributed in generic lengths and custom field-cut like lumber.

In that spirit, the particular preferred embodiments set forth above are not the only manifestations of the concept. Rather, it will be appreciated by those skilled in the art that modifications and variations thereof are possible within the scope of the present invention, nor are the herein before described preferred embodiments intended to limit the present invention to the precise terms of description nor details of illustration.

What is claimed is:

1. A laminated composite building component, capable of sustained axial stress as a primary support structure and enclosure of a building structure, comprising a lamination of rigid and resilient material, said rigid material formed of sheets with continuous corrugations parallel to the supporting axis and which have opposite faces being bonded to and encapsulated by said resilient material, said resilient material being a cellular foam matrix, an adhesive or fusion that bonds the rigid and resilient material together in either a static or continuous laminating process, said resilient material forming two outer surfaces spaced from the rigid material, said rigid material having opposite lateral edges being exposed from said resilient material, said lateral edges of the rigid material having return flanges for interlocking said laminated composite building component with adjacent building component, and said building components capable of being supplied and distributed in generic lengths and custom field-cut like lumber.

2. The composite building component of claim 1, having a composite strength at least one-hundred times greater than its weight.

3. The composite building component of claim 1, wherein said rigid material is bonded to, encapsulated by and laterally braced by said resilient material under conditions of heat, pressure and the constriction of a mold.

4. The composite building component of claim 1, having a functionally homogeneous composite structure which facilitates any divisible generic, custom or arbitrary structural shape to be fabricated from common stock and then perform structurally with reliable stress characteristics, reliable mathematical analysis, and scientifically predictable results.

5. The composite building component of claim 1, with ½" gypsum wallboard or an equivalent fire protective thermal barrier that is either factory laminated or field applied to oposite faces of said building components to satisfy the building codes.

6. The composite building component of claim 1, wherein said rigid material can sustain the axial stresses ordinarily required as primary support for a conventional building structure.

7. The composite building component of claim 1, wherein said resilient material is an expanded polymeric foam.

8. The composite building component of claim 1, further comprising an adhesive or, upon the application of heat, a fusion which bonds the rigid and resilient materials together.

9. The composite building component of claim 8, wherein said adhesive is selected from the group consisting of neoprene, acetate, urethane, epoxy and acrylic adhesives.

10. The composite building component of claim 8, comprising said adhesive which, upon the application of heat, activates a chemical reaction that forms a crystalline structural matrix and bonds the rigid and resilient materials together.

11. The composite building component of claim 10, wherein said rigid and resilient materials are bonded together, by the application of heat during the process of molding.

12. The composite building component of claim 8, wherein said adhesive is fire retardant, either by additive chemical treatment or by its own intrinsic nature.

13. The composite building component of claim 12, wherein said fire retardant adhesive is selected from the group consisting of polyvinyl acetate (PVA), ethylene vinyl acetate (EVA) or acrylic resins.

14. The composite building component of claim 1, further comprising a membrane covering that is bonded to the surface of said resilient material and, thereafter, exhibits the characteristics of a rigid material to sustain stress in the planar axis.

15. The composite building component of claim 14, wherein said membrane covering is bonded to the surface of said resilient material by an adhesive.

16. The composite building component of claim 15, wherein said membrane covering is bonded not only to the resilient material but also to exposed edges of a rigid gridlike, corrugated or honeycomb structure encapsulated within said resilient material, by said adhesive.

17. The composite building component of claim 14, wherein said membrane covering is selected from the group consisting of phenolic resin paper, unfinished fiberglass fabric, or a cellulose pulp paper reinforced with fiberglass yarns.

18. The composite building component of claim 14, wherein said membrane covering is made of a material selected from the group consisting of inorganic non-combustible textiles and materials, beta fiber, e-glass, quartz, carbonaceous residue, carbon, graphite, stainless steel, super alloy, refractory-whiskers, alumina, zirconia and boron.

19. The composite building component of claim 18, wherein said membrane covering is a glass fabric woven from uncoated glass yarns.

20. The composite building component of claim 14, wherein said membrane covering is impregnated with high temperature flame and chemical resistant fibers which are useful in architectural applications such as fireblocking underlayments to increase the ignition resistance of various materials.

21. The composite building component of claim 20, wherein said high temperature flame and chemical resistant fibers are made from polymers that are selected from the group consisting of Ryton thermoplastic resins, Ultratec polyethylene resins, Nomexd aramid resins, Kevlar aramid resins, polybenzimidazole, T-84 Polymide resins, and Kynol Phenolic resins.

22. The composite building component of claim 14, wherein said membrane covering is, itself, completely covered with a thin-film fire protective intumescent coating which, when exposed to flames and high heat, has the capability to expand, insulate and thereby protect the membrane by limiting the temperature rise on its exposed surface.

23. The composite building component of claim 22, wherein said fire protective intumescent coating is modified to become a pigmented glossy, semi-glossy or flat paint product.

24. The composite building component of claim 22, wherein said fire protective intumescent coating is exclusively applied to the outside surface of the membrane covering.

25. The composite building component of claim 22, wherein said fire protective intumescent coating is exclusively applied to the inside surface of said membrane covering.

26. The composite building component of claim 22, wherein said fire protective intumescent coating is applied to both outer and inner surfaces of the said membrane covering.

27. The composite building component of claim 22, wherein said fire protective intumescent coating is a prefinish application.

28. The composite building component of claim 22, wherein said fire protective intumescent coating is applied by spray, brush, roller or automated industrial systems such as coating equipment used in the paper or textile industries.

29. The composite building component of claim 14, wherein said membrane covering exhibits the characteristics of a ['stressed-skin'] stressed-skin structure, in which the skin or membrane absorbs all or most of the stresses to which the body of the composite is subjected and retains the capability to maintain a rigid structure.

30. The composite building component of claim 29, wherein said membrane covering is bonded to the resilient material by an adhesive.

31. The composite building component of claim 14, wherein a secondary heavy duty reinforcing membrane strip is underlaying the basic membrane covering, in predetermined locations, for the purpose of receiving mechanical fastening devices such as nails or screws to be associated with the hanging supports for pictures on a wall surface as well as the installation of architectural moldings.

32. The composite building component as claimed in claim 14, comprising said membrane covering, laminated with said adhesive to the composite building material, and treated with a fire resistive coating, making the composite thus suitable for manufacture as flat sheets which can be substituted for conventional building materials.

33. The composite building component of claim 32, wherein a synthetic corrugated structural sheet of said rigid material is encapsulated by said resilient material in a flat sheet or panel configuration.

34. The composite building component of claim 33, wherein said membrane coverings are adhered directly to the corrugated ribs of said corrugated structural sheet in order to form a total laminate structure with the resilient material of claim 1 within each linear corrugated cell so formed.

35. The composite building component of claim 1, further comprising rigid members attached to outer peripheral edges of said building components in order to provide edge protection and dimensional stability after manufacture of said components.

36. The composite building component of claim 1, wherein the exposed lateral edges of said rigid material having return flanges for interlock with adjacent building components facilitate overlapping edge configurations with said components which are especially conducive to joining systems which inhibit infiltration and exfiltration of the hermetic seal required in building enclosure systems.

37. The composite building component of claim 36, wherein in roof structure applications the exposed lateral edges of said rigid corrugated sheet material hermetically interlock said laminated composite building component with adjacent building component.

38. The composite building component of claim 1, wherein in planar configurations said corrugated sheet material is laminated within the body of the resilient material and thereby laterally braced by it to sustain stress along the planar axis of the corrugated sheet and resist failure due to buckling.

39. The composite building component of claim 1, wherein large blocks of said composite material are interconnected and interlaced into much larger reinforced configurations, for subterranean application as a floating foundation for the support of building or highway structures, or the like.

* * * * *